United States Patent [19]

Makino

[11] Patent Number: 5,111,152
[45] Date of Patent: May 5, 1992

[54] APPARATUS AND METHOD FOR DEMODULATING A DIGITAL MODULATION SIGNAL

[75] Inventor: Masaaki Makino, Shizuoka, Japan

[73] Assignee: Tokyo Electric Co., Ltd., Tokyo, Japan

[21] Appl. No.: 730,474

[22] Filed: Jul. 16, 1991

[30] Foreign Application Priority Data

Jul. 19, 1990 [JP] Japan ................................. 2-191094
May 15, 1991 [JP] Japan ................................. 3-110575

[51] Int. Cl.$^5$ .............................................. H03D 3/00
[52] U.S. Cl. .................................. 329/300; 329/302; 329/318; 375/80; 375/90
[58] Field of Search ............... 329/300, 301, 302, 303, 329/304, 315, 318, 345; 375/47, 75, 80, 90, 99

[56] References Cited

U.S. PATENT DOCUMENTS

| | | | |
|---|---|---|---|
| 4,674,105 | 6/1987 | Suziki | 329/304 X |
| 4,887,050 | 12/1989 | Borth et al. | 329/318 X |
| 4,890,302 | 12/1989 | Muilwijk | 375/80 |
| 5,001,724 | 3/1991 | Birgenbeier et al. | 329/304 X |

FOREIGN PATENT DOCUMENTS 1-240024 9/1989 Japan .

*Primary Examiner*—Robert J. Pascal
*Attorney, Agent, or Firm*—Frishauf, Holtz, Goodman & Woodward

[57] ABSTRACT

A demodulating apparatus comprises a frequency detector for performing a frequency-detection on a digital modulation signal to acquire a detection signal, a clock generator for generating a clock signal, and a discrimination circuit for sampling a voltage level of the detection signal from the frequency detector at a clock timing of the clock signal from the clock generator, and converting the sampled voltage level into digital data, which is set to have one of first and second logic values on the basis of a reference voltage LDC. Particularly, the discrimination circuit includes a control circuit for comparing the voltage level En sampled at a clock timing, voltage level En−1 sampled at a timing one clock earlier than En and voltage level En−2 sampled at a timing two clock earlier than En, with first and second threshold voltages LA and LB respectively higher and lower than the reference voltage LDC, and controlling the clock generator to synchronize the phase of the clock signal with the detection signal when it is detected from the comparison that anyone of first and second conditions is satisfied where the first condition is En−2<LB, LB≦En−1≦LA and LA<En, and the second condition is LA<En−2, LB≦En−1-≦LA and En<LB.

20 Claims, 21 Drawing Sheets

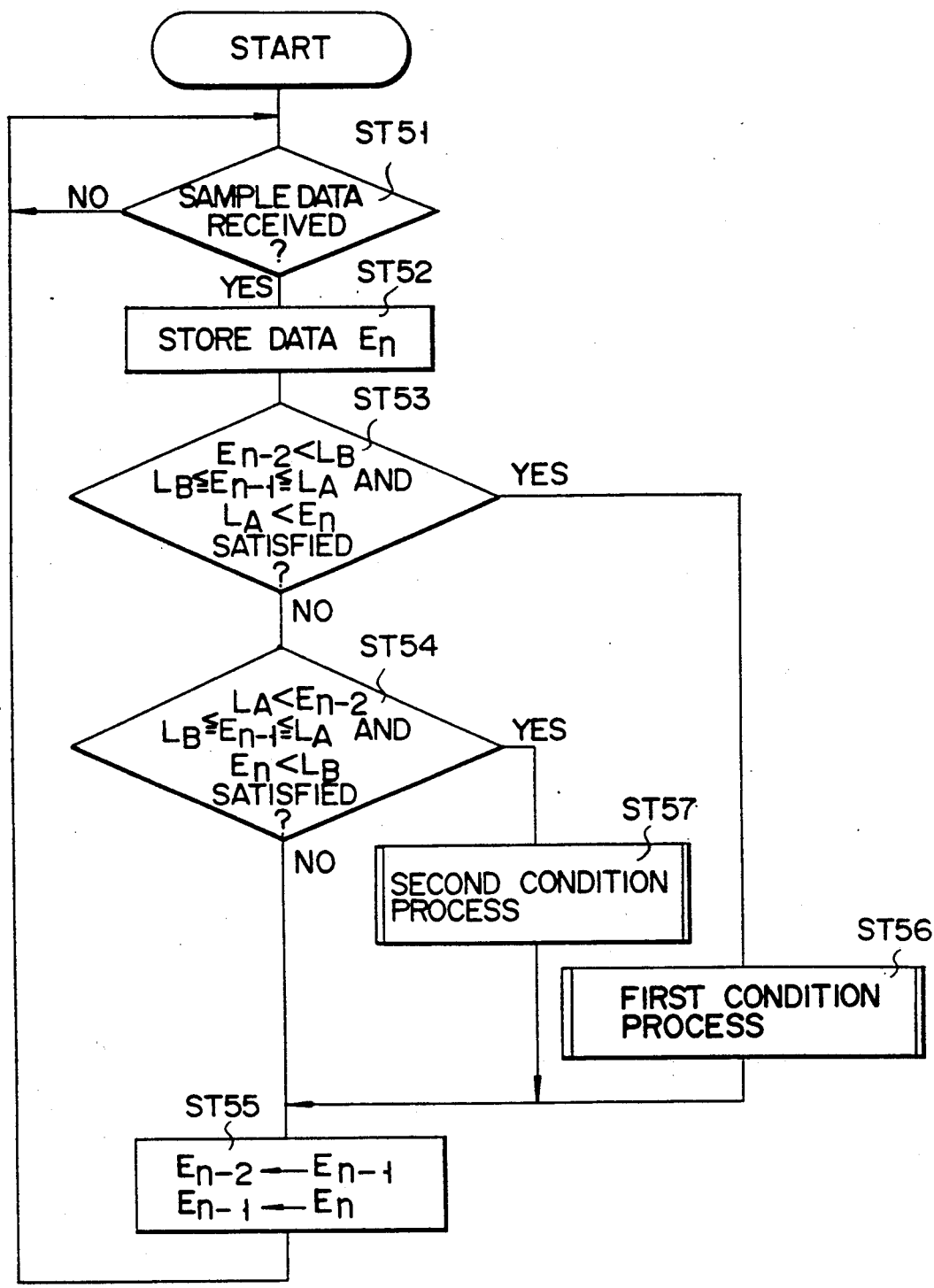
F I G. 14

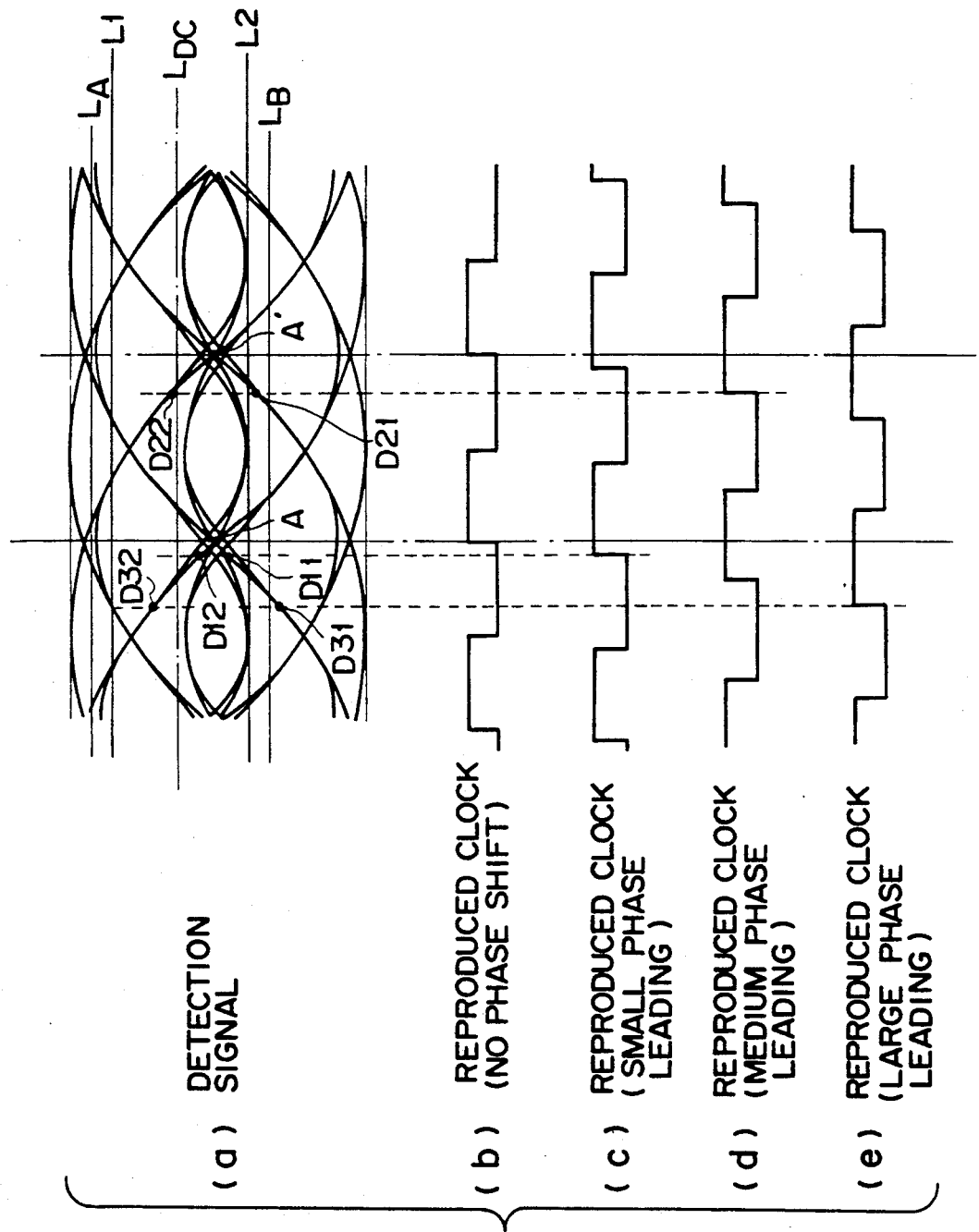
F I G. 18

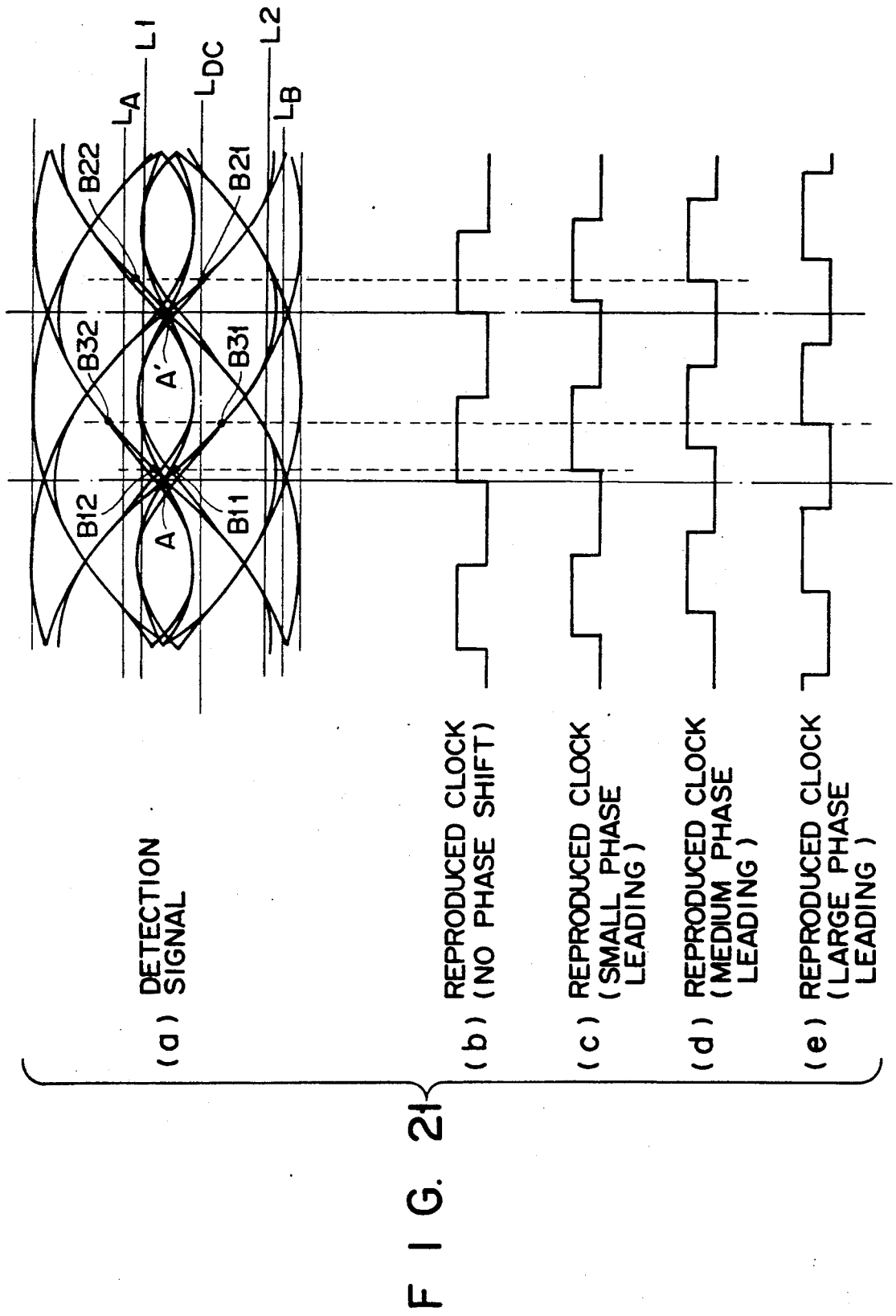

APPARATUS AND METHOD FOR DEMODULATING A DIGITAL MODULATION SIGNAL

BACKGROUND OF THE INVENTION

1. Field of the Invention

The present invention generally relates to a radio communication apparatus which receives a digital modulation signal. More particularly, this invention pertains to an apparatus and a method for demodulating a received digital modulation signal.

2. Description of the Related Art

GMSK (Gaussian filtered Minimum Shift Keying), which is known as one of narrow-band digital modulation systems, is used in mobile communications involving a mobile radiophone or a portable radiophone, for example. This radio communication apparatus for mobile communications performs frequency detection to demodulate a received GMSK modulation signal to a digital signal of a base band, periodically samples the voltage level of the detection signal, and identifies data according to each sampled level. In identifying data, the sampled level is compared with two threshold voltages L1 and L2 for data discrimination. When the sampled level is higher than the voltage L1, the data is discriminated to be "1" while when the former is lower than the voltage L2, the data is judged to be "0".

The above-described radio communication apparatus is generally equipped with a digital PLL circuit to reproduce a clock necessary to sample the detection signal. In this case, this apparatus detects a zero cross where the frequency detection signal crosses the zero level in accordance with a change in data, and generates a zero-cross signal to trigger the PLL circuit at each zero cross point. When the zero-cross signal triggers the PLL circuit, the PLL circuit controls the phase of the zero-cross signal which is generated in accordance with the data rate frequency in the radio communication apparatus, and reproduces a clock synchronous with the detection signal.

When the frequency detection signal is distorted or noise is increased due to deterioration of the receiving conditions, zero crossing frequently occurs in other points than actual data-altering points. If the PLL circuit is triggered in association with every zero cross, the clock used for sampling the detection signal will not correctly be reproduced.

Published Unexamined Japanese Patent Application No. Hei 1-240024 discloses the art for preparing a predicting time slot signal to predict the next zero-cross point based on the reproduced clock, and controlling the phase of the reproduced clock at the zero-cross point only when a zero cross occurs within the time slot.

FIG. 1 illustrates a clock reproducing circuit disclosed in this prior art. A GMSK modulation signal is received by an antenna 1, and is in turn detected by a frequency detector 2. A detection signal, the output from the detector 2, is supplied to a zero-cross selector 3. The zero-cross selector 3 includes a comparator 11, an exclusive OR (EX-OR) gate 12, an AND gate 13, a D type flip-flop 14, an RS flip-flop 15 and an inverter 16, as shown in FIG. 2. The zero-cross selector 3 detects each zero cross of the detection signal, and generates a zero-cross signal corresponding only to the zero cross, which has been detected while a time slot signal is supplied from a time slot signal generator 4. Based on a reproduced clock signal to be described later, the time slot signal generator 4 predicts the zero cross of the next detection signal, and generates the time slot signal during a predetermined period of time including a timing to be predicted as shown in FIG. 3. A high stable fixed oscillator 9 generates a pulse at a frequency N times as high as the data rate frequency of a digital signal, and supplies the pulse as a clock signal to a phase controller 8. The phase controller 8 controls the phase of the clock signal, and sends that signal to a frequency divider 5. The frequency divider 5 frequency-divides the clock signal into the data rate frequency, and generates a reproduced clock signal. A phase comparator 6 compares the phase of the zero-cross signal from the zero-cross selector 3 with that of the reproduced clock signal from the frequency divider 5, and supplies a phase difference signal corresponding to the resultant phase difference to a sequential filter 7. Based on the phase difference signal, the sequential filter 7 supplies a lead signal to the phase controller 8 when the reproduced clock signal lags behind the zero-cross signal, while sending a lag signal to the controller 8 when the reproduced clock signal leads the zero-cross signal. In response to the lag signal, the phase controller 8 eliminates part of a train of the pulses included in the clock signal to be sent from the high stable fixed oscillator 9. When receiving the lead signal, the phase controller 8 adds a pulse to the pulse train included in the clock signal. The phase of the reproduced clock signal lags when the frequency divider 5 frequency-divides the clock signal with part of the pulse train eliminated, while it leads when the divider 5 frequency-divides the clock signal with some pulse added to the pulse train. The reproduced clock signal is always controlled as described above, to be synchronized with the detection signal.

Published Unexamined Japanese Utility Model Application No. Hei 2-8243 discloses the art of compensating for the center level of a detection signal before identifying data. FIG. 4 illustrates a level compensator disclosed in this document. The compensator comprises an antenna 21, a frequency detector 22, a subtractor 23, a data discriminating circuit 24 and a level detector 25. A GMSK modulation signal, received at the antenna 21, is detected by the detector 22. The detector 22 generates a detection signal to be supplied through the subtractor 23 to the data discriminating circuit 24 and the level detector 25. This detection signal is represented in the form of an eye pattern in FIG. 5. "VR" represents a reference voltage, "V1" and "V2" are first and second decision levels, "Vs" is a signal amplitude, and "V(i−2)", "V(i−1)", "V(i)", "V(i+1)" and "V(i+2)" are signal voltage levels corresponding to a series of data. The level detector 25 includes an A/D converter 26, a clock reproducing circuit 27, an error signal generator 28, an integrator 29 and a D/A converter 30. The A/D converter 26 shifts the voltage level of the detection signal by the reference voltage VR and performs A/D conversion on the sifted level of the detection signal, which is in turn supplied to the error signal generator 28. The error signal generator 28 compares the level of the voltage undergone the A/D conversion, for example, V(i), with those of the threshold voltages V1 and V2 for phase detection. The error signal generator 28 determines the following augmenters: $V(i)-Vs$ when $V(i)>V1$, $V(i)$ when $V2<V(i)<V1$, and $V(i)+Vs$ when $V(i)<V2$. The individual augmenter corresponds to the drift from the center frequency level of the detection signal. The error signal generator 28 generates a signal of the reference voltage VR subtracted from the augmenter, as an error signal. The integrator 29 integrates the error signal, on which the D/A converter 30 then performs D/A conversion. The subtractor 23 subtracts the output signal from the D/A converter from the detection signal, to set the center level of the detection signal exactly to "zero." The data discriminating circuit 24 discriminates data based on the detection signal acquired in this manner.

The clock reproducing circuit shown in FIG. 1, however, malfunctions when noise is superposed on the detection signal within a predicted period of time that a time slot signal indicates. Should noise a be superposed on the detection signal as shown in FIG. 6, the timing at which the output of the AND gate 13 should rise would be shifted to time t' from the normal rising time t.

Further, when the frequency of a GMSK modulation signal is detected, distortion of a wave causes the detection signal not to zero-cross at a data-altering time as shown in FIG. 7. Points A, B, B', C and D in FIG. 3 corresponds to points A, B, B', C and D of the detection signal in FIG. 7. If data is altered at time tB, the detection signal normally zero crosses at point B. In the case that distortion of a waveform makes detection signal zero-cross at point B, the output of the AND gate 13 rises at time tB', instead of tB as shown in FIG. 3.

The detection signal zero-crosses at point D where time tD corresponds to a point where data is altered. If the detection signal includes the point B', where the zero cross is made by the different timing from when data is altered, and the point D, where the zero cross occurs at the timing corresponding to when data is changed, the phase of a reproduced clock signal fluctuates, i.e., a so-called jitter occurs. This bothers stable reception of the signal.

The level compensator shown in FIG. 4 refers to a timing at which the detection signal crosses the reference level VR in order to control the phase of the reproduced clock signal. When the center level of the detection signal coincides with the reference voltage VR as illustrated in FIG. 5, even if the phase of a reproduced clock is shifted, the level compensator acquires a phase difference $\theta$ between time ti when the detection signal crosses the reference voltage VR and time tj when the reproduced clock is changed, and controls the phase of the reproduced clock.

In the case that the detection signal somehow has its center frequency level shifted from the reference voltage VR, the following shortcoming would occur. If the center level of the detection signal is shifted up, points, such as B1 and D, are where the detection signal crosses the reference voltage VR. Even if the reproduced clock is properly synchronized with the detection signal, the phase of the reproduced clock does not coincide with the detected cross points D and B1. The phase of the reproduced clock leads when the cross at the point D is detected, while it lags when the cross at the point B1 is detected. As a result, the reproduced clock will not be synchronized with the detection signal.

Further, if the phase of the reproduced clock is shifted with respect to the detection signal, the reproduced clock cannot be synchronized with the detection signal. When the cross of the signal is detected at the point B, a phase difference $\theta$ between this cross and the reproduced clock is zero, thus requiring no phase control of the reproduced clock. When the signal crossing at the point D is detected, the phase of the reproduced clock will be erroneously adjusted based on a phase difference $\theta'$ between this cross and the reproduced clock.

There is another shortcoming in the case of compensating for the center level of the detection signal. The error signal generator 28 determines $V(i)-Vs$ as an augmenter when $V(i)>V1$. When the GMSK modulation signal is subjected to frequency detection, the resultant detection signal has a level $V(i)>V1$ at three points A1, A2 and A3. More specifically, augmenters at these points should be $V(i)-Vs1$, $V(i)-Vs2$ and $V(i)-Vs$, respectively. If all the augmenters are determined as $V(i)-Vs$, however, a compensation difference will occur at the points A1 and A2. The same is true of when $V(i)<V2$.

The occurrence of the compensation difference described above supposes no phase shift in the reproduced clock signal. If the reproduced clock signal has its phase shifted, A/D conversion will be performed on the level at the point B3, instead of the level at the point A1. The exact augmenter in this case is $V(i)-Vs3$. When the augmenter is determined as $V(i)-Vs$ or $V(i)-Vsl$, the phase shift in the reproduced clock signal causes erroneous compensation for the center level of the detection signal, although that level is not actually shifted.

SUMMARY OF THE INVENTION

It is therefore an object of the present invention to provide a demodulating apparatus and a demodulating method, which are hardly affected by noise or a phase jitter in phase control of a reproduced clock.

To achieve this object, according to one aspect of the present invention, there is provided a demodulating apparatus comprising: a frequency detector for performing a frequency detection on a digital modulation signal to acquire a detection signal; a clock generator for generating a clock signal; and a discrimination section for sampling a voltage level of the detection signal from the frequency detector at a clock timing of the clock signal from the clock generator, and converting the sampled voltage level into digital data, which is set to have one of first and second logic values on the basis of a reference voltage LDC; wherein the discrimination section includes a control circuit for comparing the voltage level En sampled at a clock timing, voltage level $En-1$ sampled at a timing one clock earlier than En and voltage level $En-2$ sampled at a timing two clock earlier than En, with first and second threshold voltages LA and LB respectively higher and lower than the reference voltage LDC, and controlling the clock generator to synchronize the phase of the clock signal with the detection signal when it is detected from the comparison that anyone of first and second conditions is satisfied where the first condition is $En-2<LB$, $LB \leq En-1 \leq LA$ and $LA<En$, and the second condition is $LA<En-2$, $LB \leq En-1 \leq LA$ and $En<LB$.

According to another aspect of the present invention, there is provided a demodulating method comprising: a first step of performing a frequency-detection on a digital modulation signal to acquire a detection signal; a second step of generating a clock signal; a third step of sampling a voltage level of the detection signal at a clock timing of the clock signal, and converting the sampled voltage level into digital data, which is set to have one of first and second logic values on the basis of a reference voltage LDC; and a fourth step of comparing the voltage level En sampled at a clock timing, voltage level En−1 sampled at a timing one clock earlier than En and voltage level En−2 sampled at a timing two clock earlier than En, with first and second threshold voltages LA and LB respectively higher and lower than the reference voltage LDC, and controlling the phase of the clock signal to be synchronized with the detection signal when it is detected from the comparison that anyone of first and second conditions is satisfied where the first condition is En−2<LB, LB≦En−1≦LA and LA<En, and the second condition is LA<En−2, LB≦En−1≦LA and En<LB.

According to the demodulating apparatus and demodulating method of the present invention, the phase difference between a reproduced clock and a detection signal is detected under more appropriate conditions, so that the phase of the reproduced clock will not easily be affected by noise and a phase jitter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14 to 16 are flowcharts showing the operation of a microcomputer used in a radio communication apparatus according to the third embodiment; and FIGS. 17 through 21 are waveform diagrams for explaining the phase control on the clock signal in the third embodiment.

DETAILED DESCRIPTION OF THE PREFERRED EMBODIMENTS

A radio communication apparatus according to the first embodiment of the present invention will now be described referring to FIGS. 9 through 12.

Figure 1:
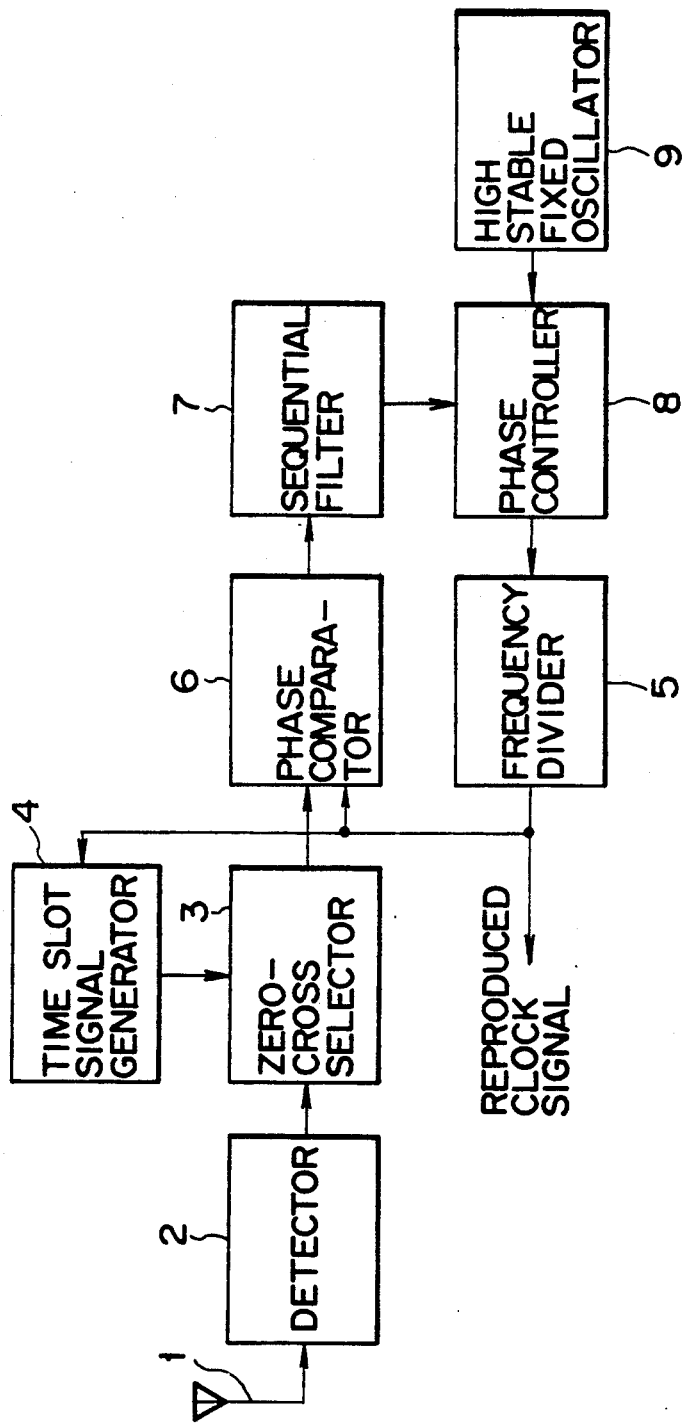
FIG. 1 is a diagram illustrating the arrangement of a conventional clock reproducing circuit.
Figure 2:
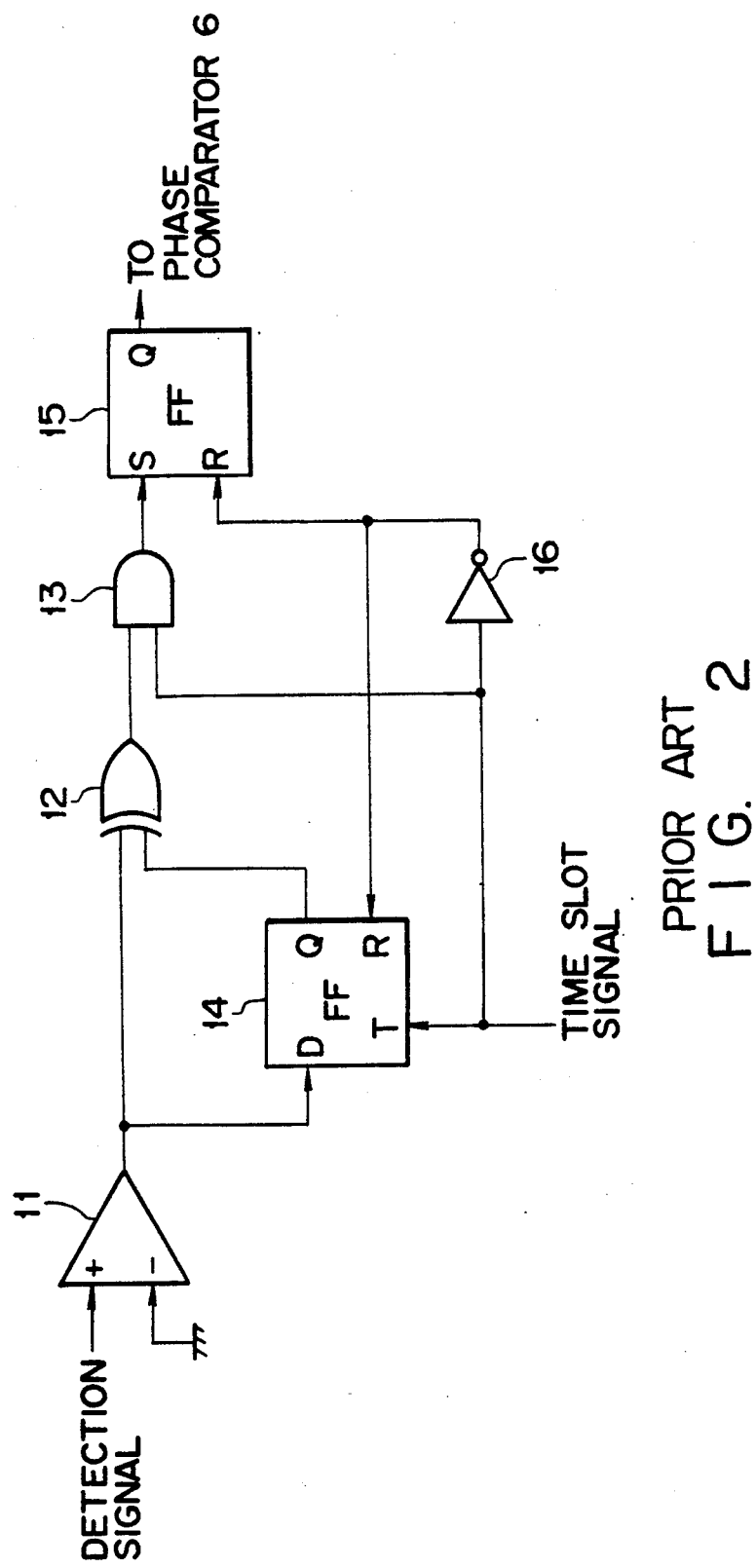
FIG. 2 is a diagram illustrating the arrangement of a zero-cross selector shown in FIG. 1.
Figure 3:
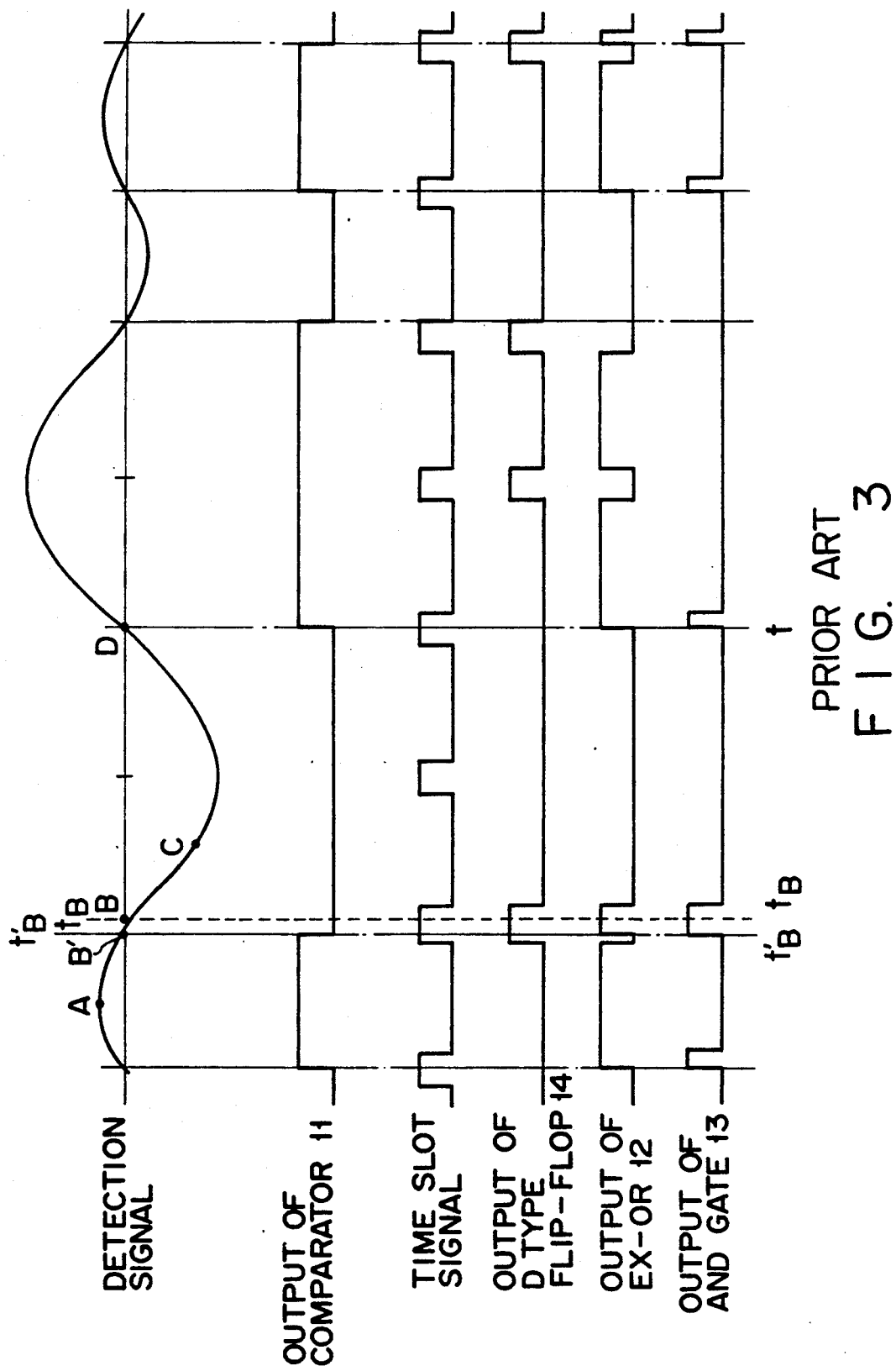
FIG. 3 is a waveform diagram of signals to be processed by the zero-cross selector shown in FIG. 2.
Figure 4:
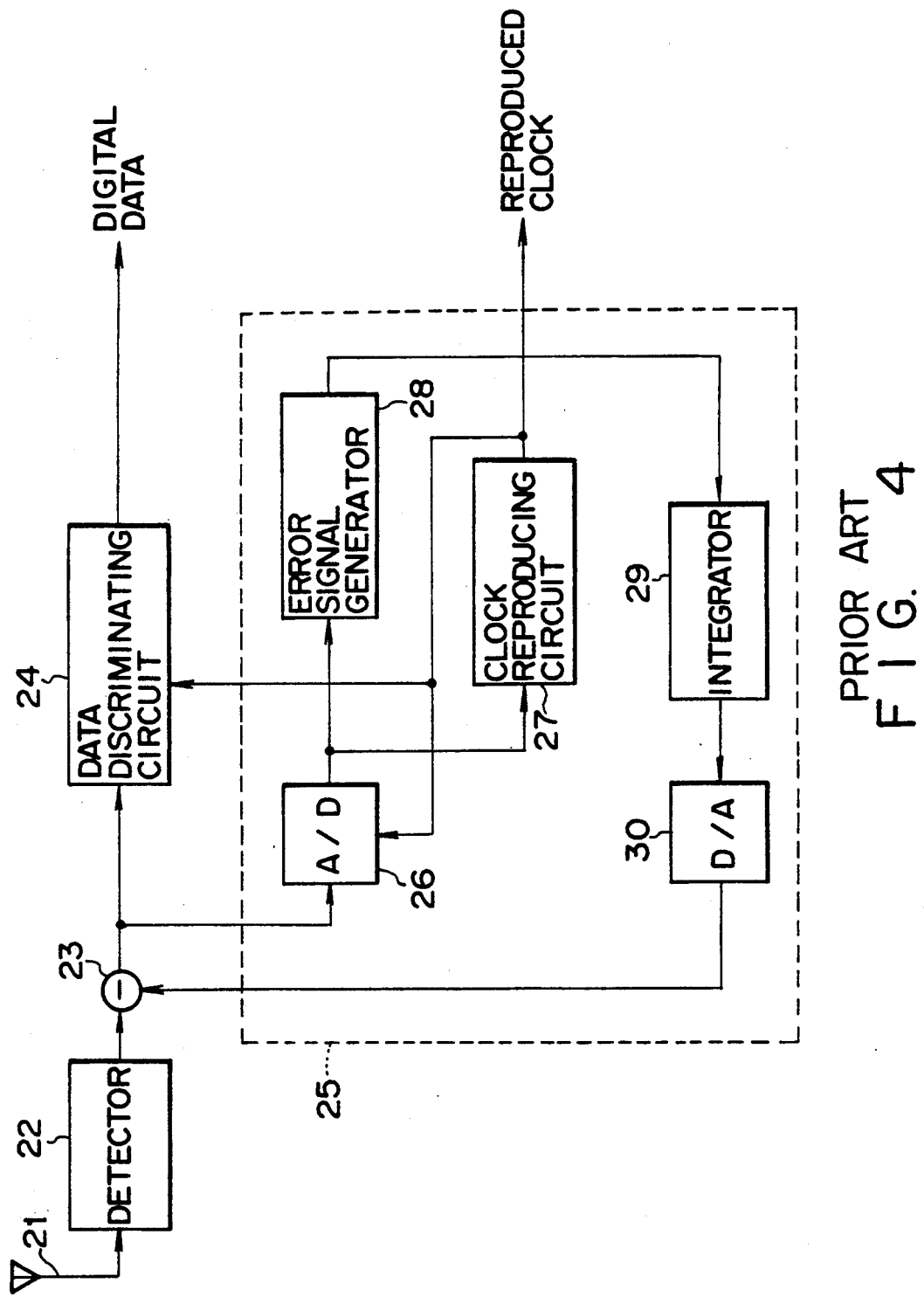
FIG. 4 is a block diagram illustrating the arrangement of a conventional level compensator.
Figure 5:
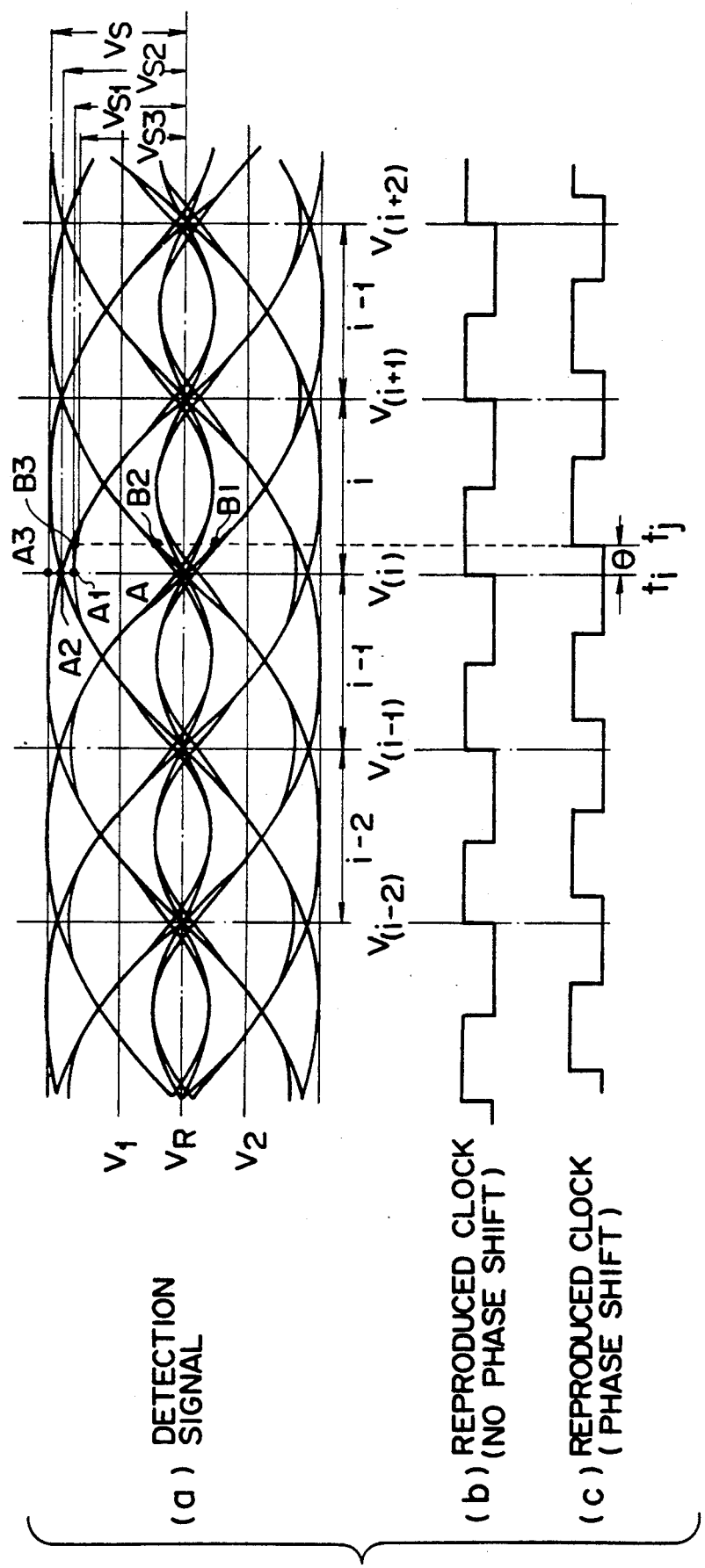
FIG. 5 is a waveform diagram of detection signals and reproduced clock signals which are processed by the level compensator in FIG. 4.
Figure 6:
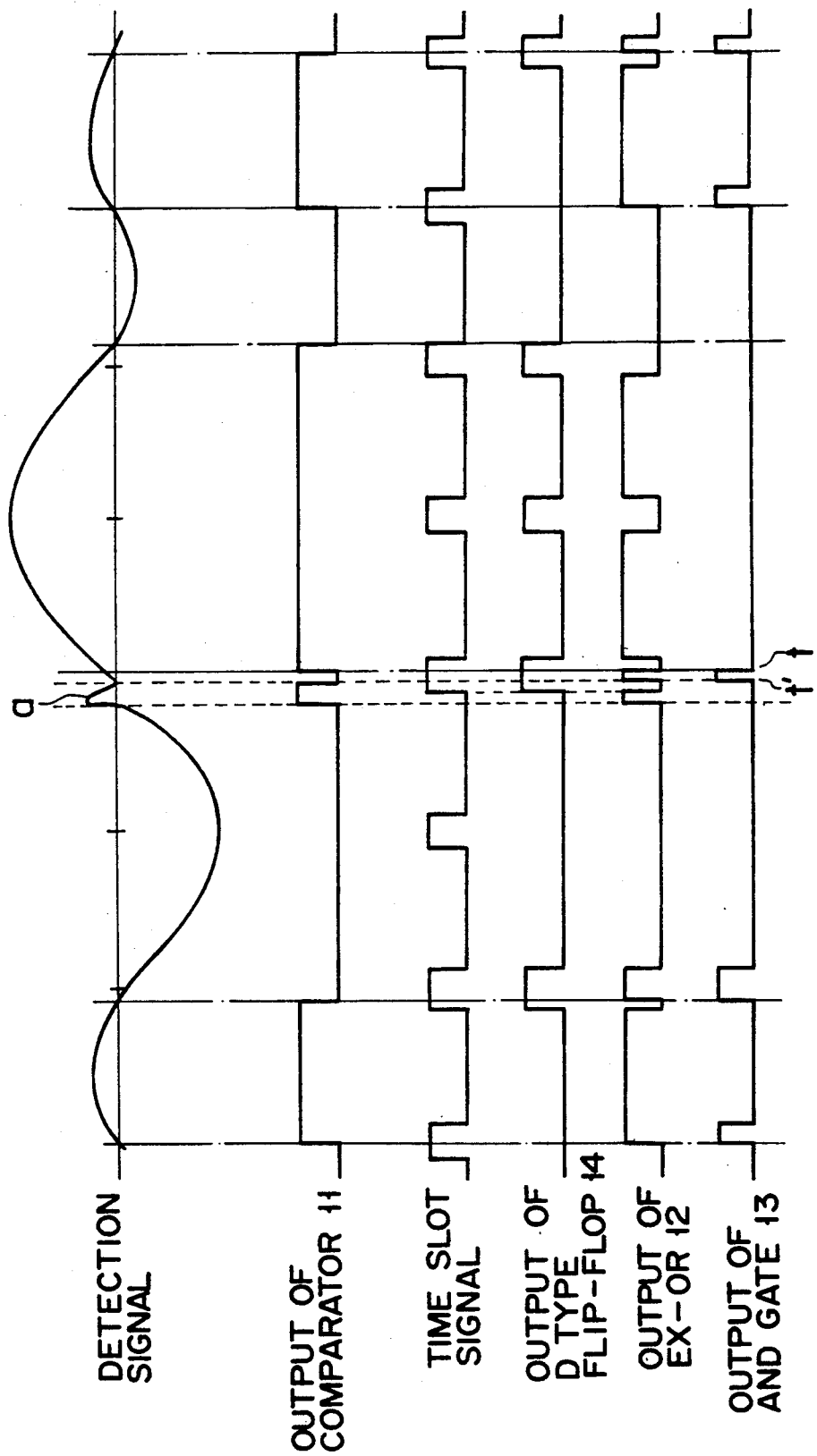
FIG. 6 is a waveform diagram for explaining when noise is superposed on the detection signal shown in FIG. 2.
Figure 7:
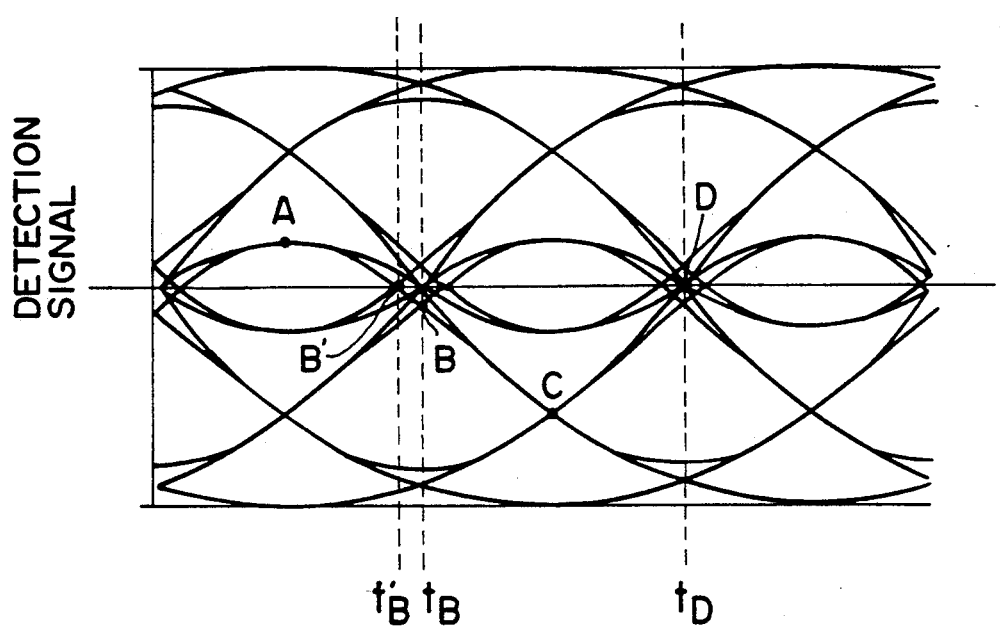
FIG. 7 is a waveform diagram for explaining a shift of the zero cross of the detection signal.
Figure 8:
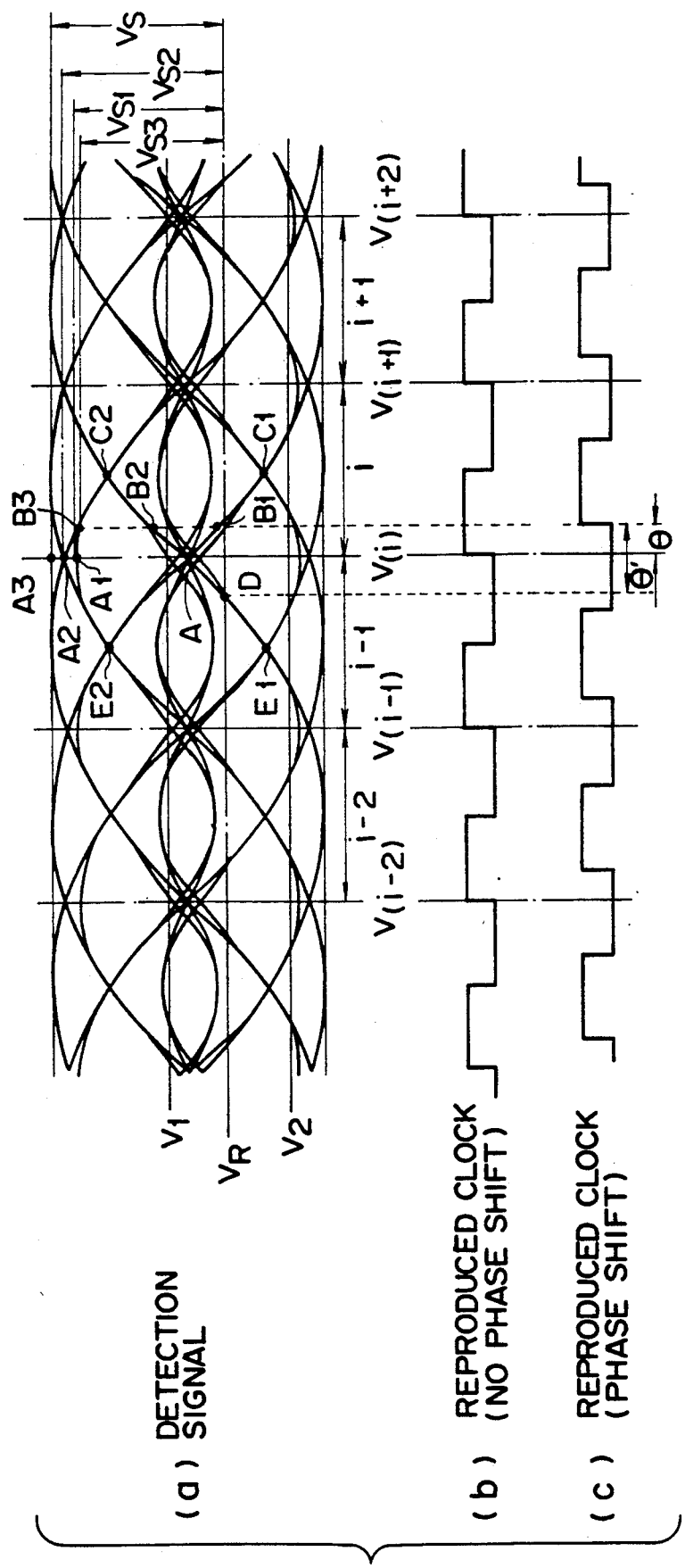
FIG. 8 is a waveform diagram for explaining a shift of the center level of the detection signal.
Figure 9:
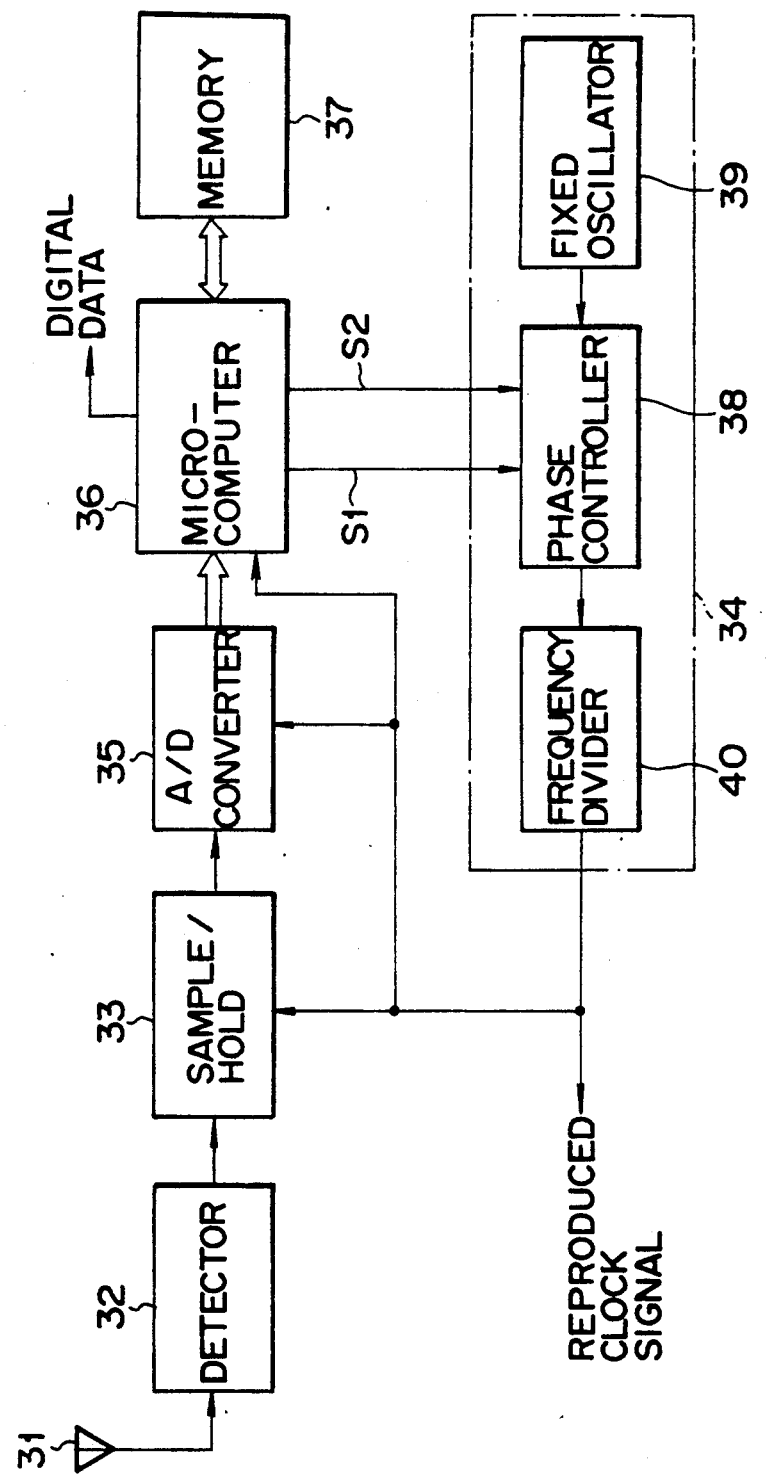
FIG. 9 is a block diagram illustrating the demodulation section of a radio communication apparatus according to the first embodiment of the present invention.

FIG. 9 illustrates the circuit structure of the demodulation section in the radio communication apparatus. This demodulation section includes a frequency detector 32, a sample and hold (sample/hold) circuit 33, a clock signal generator 34, an A/D converter 35, a microcomputer 36 and a memory 37. A GMSK modulation signal is received by an antenna 31 and is in turn supplied to the detector 32. The detector 32 performs a frequency-detection on the modulation signal, and supplies a resultant detection signal to the sample/hold circuit 33. The sample/hold circuit 33 performs sampling on the voltage level of the detection signal by the clock timing of a reproduced clock signal to be sent from the clock signal generator 34, and supplies the sampled voltage to the A/D converter 35. The A/D converter 35 then converts the voltage level obtained by sampling into level data, which is sent to the microcomputer 36. The microcomputer 36 stores the level data from the A/D converter 35 in the memory 37, and uses this level data and previously stored level data to control the phase of the reproduced clock signal. A reference voltage LDC, and the first to fourth threshold voltages L1, L2, LA and LB, which are determined according to the characteristics of circuits, such as the detector 32 and the A/D converter 35, are stored as preset data in the memory 37. The preset data may be prepared by the microcomputer 36 and be stored in the memory 37. In this case, GMSK modulation is performed on a dummy digital signal in advance. When receiving the GMSK modulation signal corresponding to the dummy digital signal, the microcomputer 36 prepares the preset data based on the level data to be sent from the A/D converter 35. The reference voltage LDC is used to shift the voltage level of the detection signal, and the center level of the detection signal is set to the reference voltage LDC at the starting of communication. The first and second threshold voltages L1 and L2 are used for determining whether the sampled level of the detection signal is "1" or "0." The third and fourth threshold voltages LA and LB are used for the phase detection of the clock signal. The threshold voltage L1 and LA are higher than the reference voltage LDC, and the threshold voltages L2 and LB are lower than reference voltage LDC. The clock signal generator 34 comprises a fixed oscillator 39, a phase controller 38 and a frequency divider 40. The fixed oscillator 39 oscillates a clock pulse by the frequency N times as much as data rate frequency of the digital signal, and sends this pulse as a clock signal to the phase controller 38. The phase controller 38 then controls the phase of the clock signal and supplies it to the frequency divider 40. The frequency divider 40 divides the clock signal by N to generate a reproduced clock signal with the data rate frequency. This reproduced clock signal is supplied as a timing signal to the sample/hold circuit 33, the A/D converter 35 and the microcomputer 36.

Figure 10:
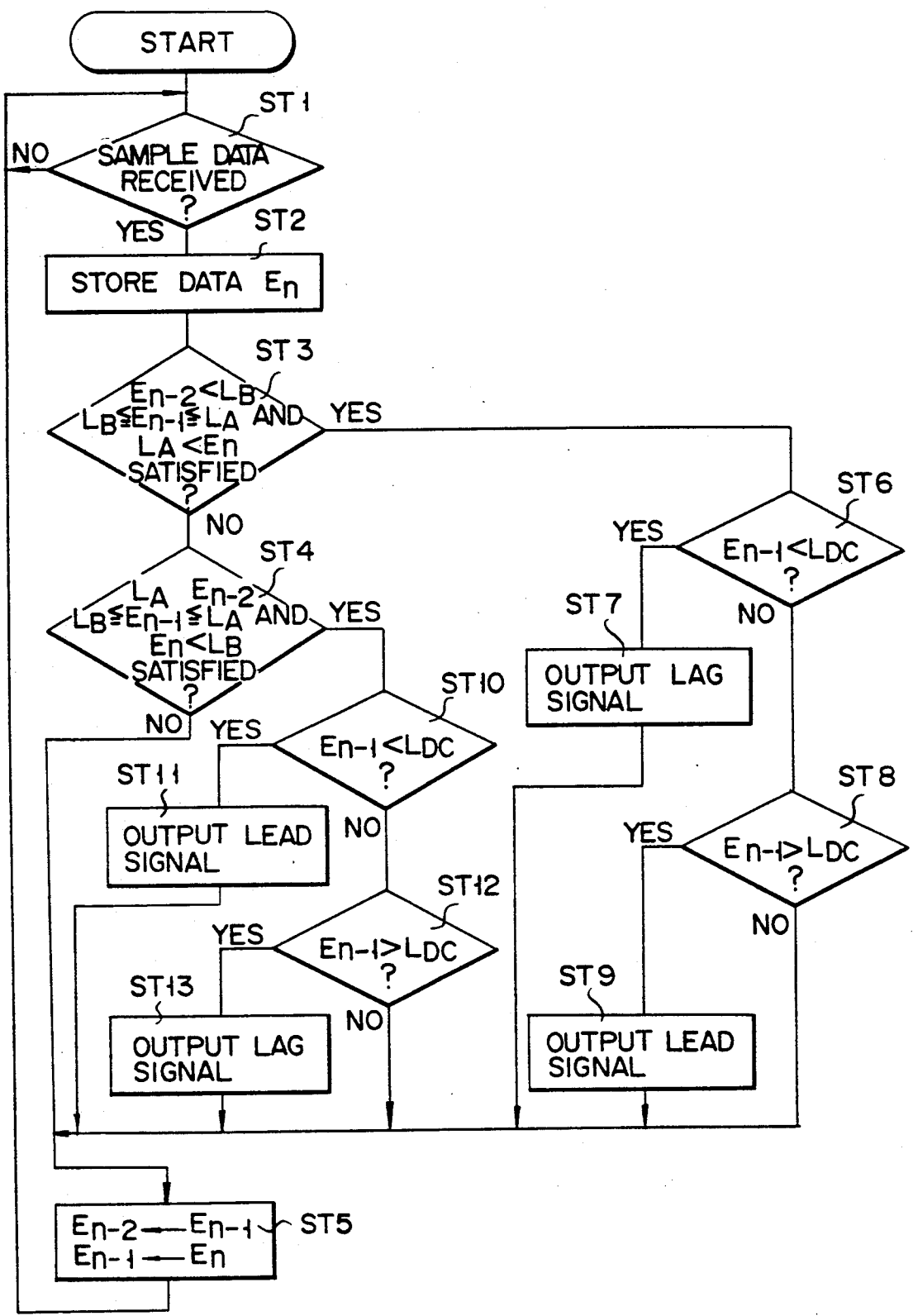
FIG. 10 is a flowchart showing the operation of the microcomputer shown in FIG. 9.

The microcomputer 36 is programmed to perform processing as illustrated in FIG. 10 in a demodulation operation. The microcomputer 36 checks in step ST1 whether or not the level data En from the A/D converter 35 is received. When the reception of the level data En is confirmed, the microcomputer 36 stores En into the memory 37, and compares level data, En, En−1 and En−2, the latter two having been stored in the memory 37 before the level data En, with the third threshold voltage LA and the fourth threshold voltage LB in step ST2. In subsequent step ST3, it is checked if the first condition of En−2<LB, LB≦En−1≦LA and LA<En is satisfied. If the first condition is not satisfied, it is checked in step ST4 if the second condition of LA<En−2, LB≦En−1≦LA and En<LB is satisfied. If the second condition is not satisfied either, the microcomputer 36 sets the level data En−1 stored in the memory 37 to the level data En−2, and sets the level data En to the level data En−1 in step ST5. Then, the microcomputer 36 returns to step ST1.

If the first condition of En−2<LB, LB≦En−1≦LA and LA<En is satisfied in step ST3, it is then checked if En−1<LDC in step ST6. If En−1<LDC, the microcomputer 36 generates a lag signal S2 and sends it to the phase controller 38 in step ST7 before executing step ST5 If En−1<LDC is not detected in step ST6, it is then checked if En−1>LCD in step ST8. If En−1>LDC, the microcomputer 36 generates a lead signal S1 and sends it to the phase controller 38 in step ST9 before executing step ST5. If En−1 =LDC is detected in step ST8, step ST5 will be executed.

If the second condition of LA<En−2, LB≦En−1≦LA and En<LB is satisfied in step ST4, it is then checked if En−1<LDC in step ST10. If En−1<LDC, the microcomputer 36 generates the lead signal S1 and sends it to the phase controller 38 in step ST11 before executing step ST5. If En−1<LDC is not detected in step ST10, it is then checked if En−1>LCD in step ST12. If En−1>LDC, the microcomputer 36 generates the lag signal S2 and sends it to the phase controller 38 in step ST13 before executing step ST5. If En−1 =LDC is detected in step ST12, step ST5 will be executed.

The phase controller 38 receives the clock signal from the fixed oscillator 39, removes part of a pulse train included in this clock signal in response to the lag signal S2, and adds a pulse to the pulse train included in the clock signal in response to the lead signal S1. The phase of the reproduced clock signal lags when the frequency divider 40 frequency-divides the clock signal with part of the pulse train removed, and it leads when the frequency divider 40 frequency-divides the clock signal having a pulse added to this pulse train. In this manner, the reproduced clock signal is always controlled to be synchronized with the detection signal.

According to the first embodiment, when fetching the level data En of the detection signal from the A/D converter 35, the microcomputer 36 checks if the first condition of En−2<LB, LB≦En−1≦LA and LA<En is satisfied. If the first condition is not satisfied, the microcomputer 36 checks if the second condition of LA<En−2, LB≦En−1≦LA and En<LB is satisfied.

When the first condition is satisfied, it is then checked if the level data En−1 is lower than the reference voltage LDC. If En−1<LDC, it is determined that the phase of the reproduced clock signal leads the supplied to the phase controller 38. If En−1>LDC, it is determined that the phase of the reproduced clock signal lags behind the phase of the detection signal, and the lead signal S1 is supplied to the phase controller 38. If En−1=LDC, it is determined that the phase of the reproduced clock signal is normal, and neither the lag signal nor the lead signal is supplied to the phase controller 38.

When the second condition is satisfied, it is then checked if the level data En−1 is lower than the reference voltage LDC. If En−1<LDC, it is determined that the phase of the reproduced clock signal lags behind the phase of the detection signal, and the lead signal S1 is supplied to the phase controller 38. If En−1>LDC, it is determined that the phase of the reproduced clock signal leads the phase of the detection signal, and the lag signal S2 is supplied to the phase controller 38. If En−1=LDC, it is determined that the phase of the reproduced clock signal is normal, and neither the lag signal no the lead signal is supplied to the phase controller 38.

In other words, only when the detection signal satisfies the first condition or the second condition, the phase of the reproduced clock is checked, and phase control is performed when there is a phase difference. This method can improve the stability of the phase control, which may be deteriorated by noise and a phase jitter, as compared with the conventional method that compares every zero cross with the phase of the reproduced clock signal, so that the reproduced clock can accurately be synchronized with the detection signal.

The phase control will be further described below referring to FIG. 11.

Figure 11:
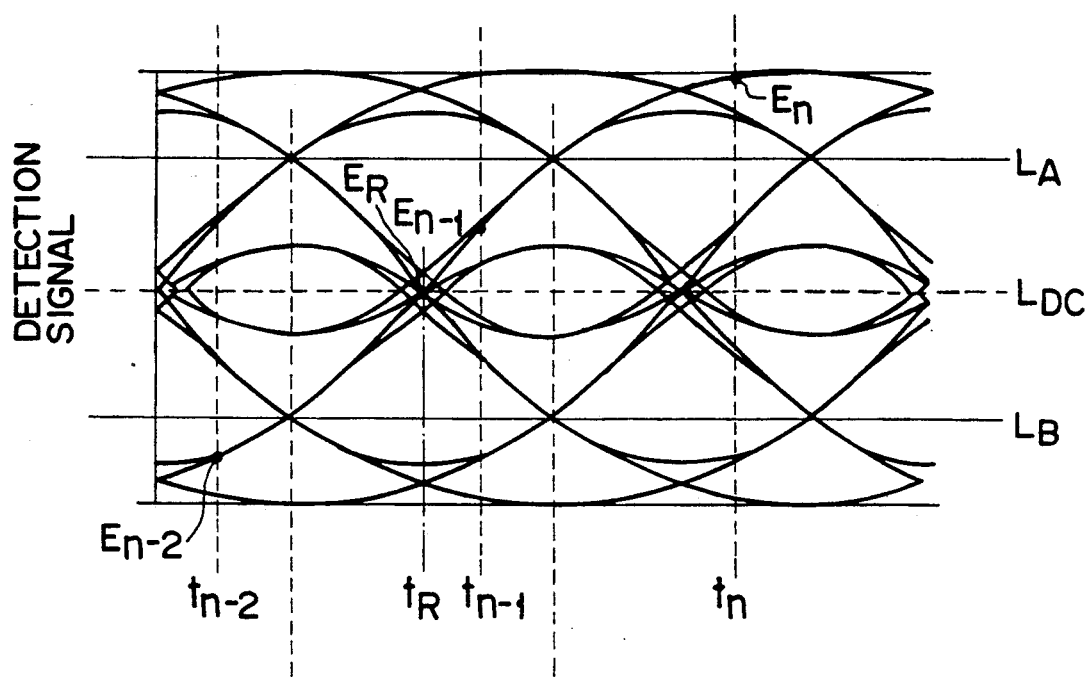
FIGS. 11 and 12 are waveform diagrams for explaining the phase control on the clock signal.

In FIG. 11, point ER corresponds to the voltage level of the detection signal at timing tR where data is changed. If the phase of the reproduced clock is controlled to coincides with the timing tR where data is changed, sampling is executed in synchronism with the detection signal. Suppose that level data En, En−1 and En−2 are acquired at clock timings tn, tn−1 and tn−2, respectively. When these data are compared with the third threshold voltage LA and the fourth threshold voltage LB, the first condition of En−2<LB, LB≦En−1≦LA and LA<En is satisfied. As the level data En−1 is compared with the reference voltage LDC, En−1>LDC is detected and the clock signal generator 34 is controlled to lead the phase of the reproduced clock signal, causing the clock timing tn−1 to approach the timing tR where data is changed.

Figure 12:
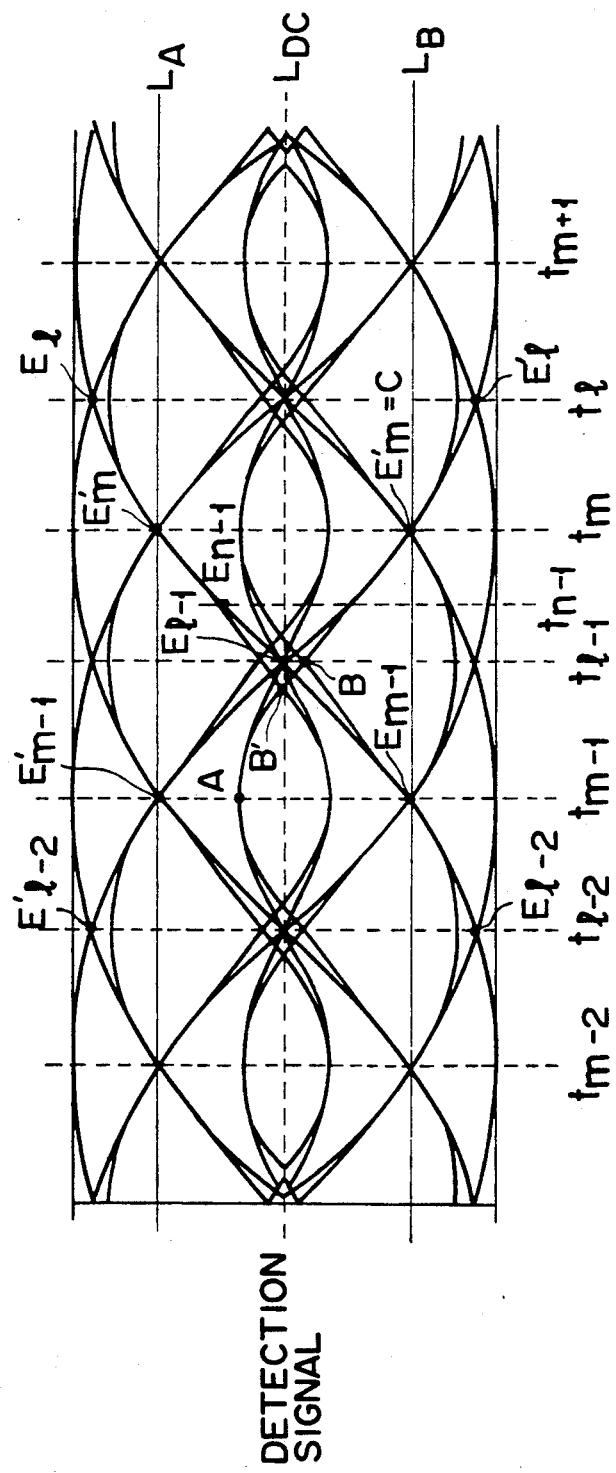

In FIG. 12, point E1−1 corresponds to the voltage level of the detection signal at timing t1−1 where data is changed. Suppose that level data E1, E1−1 and E1−2 are acquired at clock timings t1, t1−1 and t1−2, respectively. When these data are compared with the threshold voltage LA and the threshold voltage LB, the first condition of E1−2<LB, LB≦E′−1≦LA and LA<E1 is satisfied. As the level data E1−1 is compared with the reference voltage LDC, E1−1>LDC is detected. In this case, the clock signal generator 34 is controlled to keep the phase of the reproduced clock signal.

Suppose that level data E1′, E1−1′ and E1−2′ are acquired at clock timings t1, t1−1 and t1−2, respectively. When these data are compared with the threshold voltage LA and the threshold voltage LB, the second condition of E1−2′<LA, LB≦E′−1≦LA and LB<E1′ is satisfied. As the level data E1−1′ is compared with the reference voltage LDC, E1−1′>LDC is detected. In this case, the clock signal generator 34 is controlled to keep the phase of the reproduced clock signal.

That is, according to this embodiment, every zero cross is not compared with the phase of the clock signal, but the phase shift of the clock signal is checked only when the first condition or second condition is satisfied, and phase control is executed to compensate for the phase shift.

The detection signal that satisfies the first condition has a waveform passing all of three points $Em-1$, $E1-1$ and $Em$ in FIG. 12. The detection signal that satisfies the second condition has a waveform passing all of three points $Em-1'$, $E1-1$ and $Em'$ in FIG. 12.

Only when there appears a waveform which satisfies one of the first and second conditions, therefore, sampling is performed at a clock timing $tn-1$ between clock timings $tm-1$ and $tm$, and phase control is executed so that the level data $En-1$ acquired by the sampling coincides with the reference voltage LDC or $En-1$ becomes $E1-1$, thereby permitting the phase of the clock signal to be synchronized with that of the detection signal.

According to this embodiment, therefore, the phase control is not executed when the detected waveform passes points A, B', B and C (Em'), although it crosses the reference voltage LDC with an error, as shown in FIG. 12.

According to the above-described embodiment, the microcomputer 36 generates a pulse signal as the lead signal S1 and lag signal S2. When first or second condition is satisfied, the microcomputer 36 supplies one pulse as the lead signal S1 or lag signal S2 to the phase controller 38. Upon reception of one pulse as the lead signal S1, the phase controller 38 performs the phase control to lead the phase of the reproduced clock by 1/N period. Upon reception of one pulse as the lag signal S2, the phase controller 38 performs the phase control to lag the phase of the reproduced clock by 1/N period. This control relatively takes time until the phase of the clock is synchronized with that of the detection signal after occurrence of a phase shift, but can reduce a phase difference originated from noise on the detection signal.

With regard to the phase control, the above embodiment may be modified as follows.

According to the first modification, the lead signal S1 and lag signal S2 indicates not only the phase leading and phase lagging of the reproduced clock, but also the phase difference between the reproduced clock and the detection signal. The microcomputer 36 detects the difference between the voltage level $En-1$ of the detection signal sampled at $tn-1$ and the reference voltage LDC, determines the phase augmenter based on this difference, and supplies the lead signal S1 or lag signal S2 of the level corresponding to this phase augmenter to the phase controller 38. The phase controller 38 performs such phase control as to lead the phase of the reproduced clock by an M/N period upon reception of the lead signal S1, and as to lag the phase of the reproduced clock by an M/N period upon reception of the lag signal S2, where M is a positive integer that varies in accordance with the level of the lead signal S1 or lag signal S2, and is proportional to the phase augmenter. The phase augmenter is set large when the reproduced clock is considerably shifted from the detection signal, while it is set small when there is a small shift between the reproduced clock and detection signal. Although this phase control may provide an inaccurate phase augmenter when noise is put on the detection signal, it can shorten the time required to provide synchronization between the reproduced clock and the detection signal.

According to the second modification, the microcomputer 36 exceptionally generates the lead signal S1 and lag signal S2 in the manner done in the first modification only immediately after data reception has started. More specifically, the phase augmenter of the reproduced clock is set to an M/N period per step when data reception starts, and is fixed to a 1/N period per step thereafter. This phase control permits the phase of the reproduced clock to be synchronized with the detection signal quickly after the data reception has started, thereby suppressing a phase difference originated from noise superposed on the detection signal after the synchronization has been established to accurately maintain the synchronization.

A radio communication apparatus according to the second embodiment of the present invention will be described below referring to FIG. 13. The demodulation section of this radio communication apparatus is the same as the one used in the first embodiment except the structure of the microcomputer 36. The following will describe where the second embodiment differs from the first embodiment.

Figure 13:
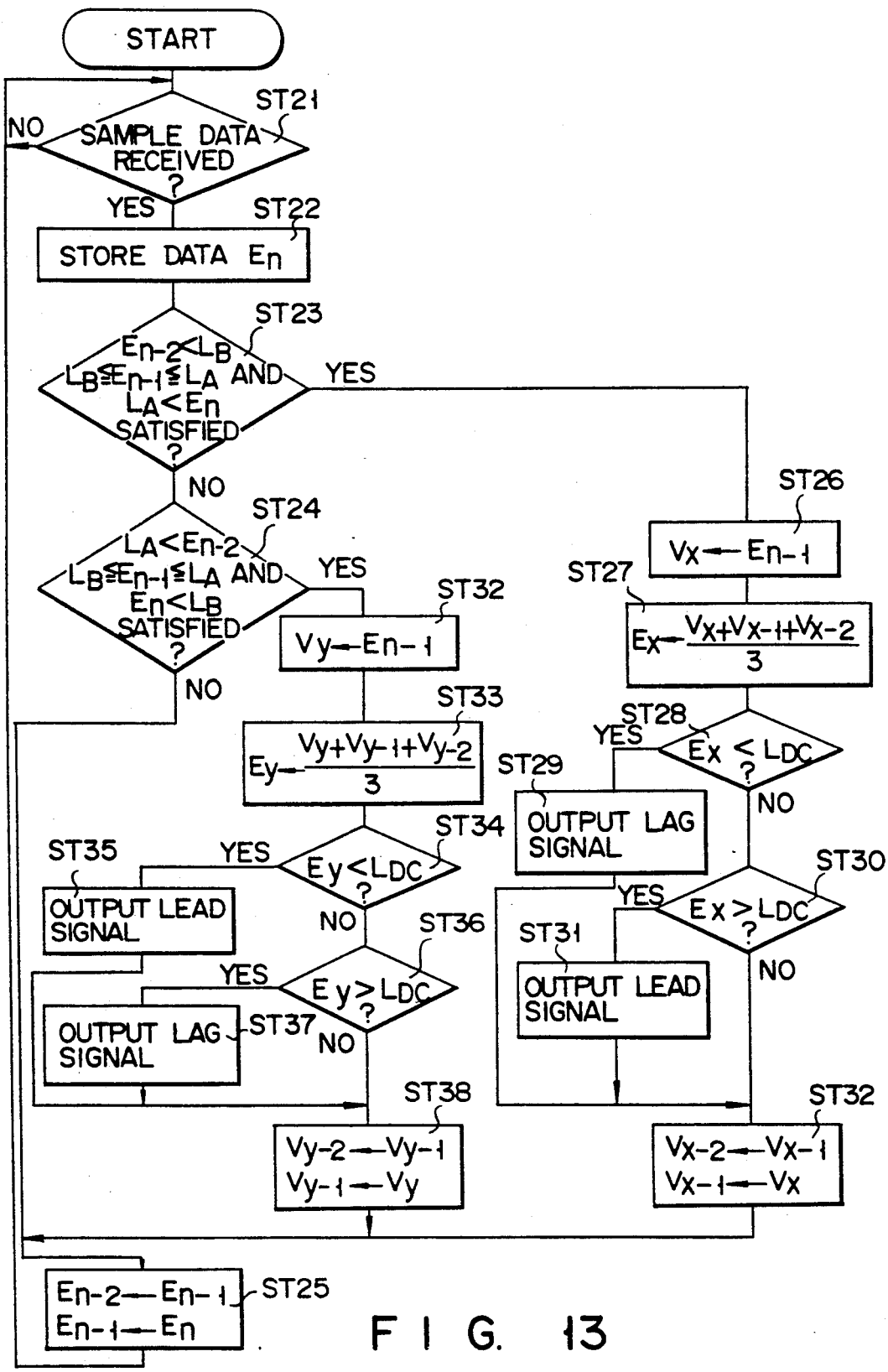
FIG. 13 is a flowchart showing the operation of a microcomputer used in a radio communication apparatus according to the second embodiment.

The microcomputer 36 of the second embodiment is programmed to perform the processing as illustrated in FIG. 13. The microcomputer 36 checks in step ST21 whether or not the level data En from the A/D converter 35 is received. When the reception of the level data En is confirmed, in step ST22 the microcomputer 36 stores En into the memory 37, and compares level data En, $En-1$ and $En-2$, the latter two having been stored in the memory 37 before the level data En, with the third threshold voltage LA and the fourth threshold voltage LB. In subsequent step ST23, it is checked if the first condition of $En-2 < LB$, $LB \leq En-1 \leq LA$ and $LA < En$ is satisfied. If the first condition is not satisfied, it is checked in step ST24 if the second condition of $LA < En-2$, $LB \leq En-1 \leq LA$ and $En < LB$ is satisfied. If the second condition is not satisfied either, the microcomputer 36 sets the level data $En-1$ stored in the memory 37 to the level data $En-2$, and sets the level data En to the level data $En-1$ in step ST25. Then, the microcomputer 36 returns to step ST21.

When the first condition is satisfied in step ST23, the level data $En-1$ is stored as level data Vx in the memory 37 in step ST26. In step ST27, the level data Vx, and the level data $Vx-1$ and $Vx-2$ both previously stored in the memory 37 are averaged, and the average value is stored as average level data Ex in the memory 37. It is checked in step ST28 whether this average level data Ex is lower than the reference voltage LDC. When $Ex < LDC$ is detected, the microprocessor 36 generates the lag signal S2 in step ST29, which is supplied to the phase controller 38. In step ST32, the level data $Vx-1$ and Vx which are stored in the memory 37 are set to the level data $Vx-2$ and $Vx-1$, respectively. The step ST25 is then executed. When $Ex < LDC$ is not detected in step ST28, it is determined in step ST30 if the average level data Ex is greater than the reference voltage LDC. When $Ex > LDC$ is detected, the microprocessor 36 generates the lead signal S1 in step ST31 which is in turn supplied to the phase controller 38. The level data $Vx-1$ and Vx stored in the memory 37 are set to the level data $Vx-2$ and $Vx-1$, respectively. The step ST25 is then executed.

When the second condition is satisfied in step ST24, the level data $En-1$ is stored as level data Vy in the memory 37 in step ST32. In step ST33, the level data Vy, and the level data $Vy-1$ and $Vy-2$ both previously stored in the memory 37 are averaged, and the average value is stored as average level data Ey in the memory 37. It is checked in step ST34 whether this average level data Ey is lower than the reference voltage LDC. When Ey<LDC is detected, the microprocessor 36 generates the lead signal S1 in step ST35, which is supplied to the phase controller 38. In step ST38, the level data Vy−1 and Vy which are stored in the memory 37 are set to the level data Vy−2 and Vy−1, respectively. The step ST25 is then executed. When Ey <LDC is not detected in step ST34, it is determined in step ST36 if the average level data Ey is greater than the reference voltage LDC. When Ey>LDC is detected, the microprocessor 36 generates the lag signal S2 in step ST37 which is in turn supplied to the phase controller 38. The level data Vy−1 and Vy stored in the memory 37 are set to the level data Vy−2 and Vy−1, respectively. The step ST25 is then executed.

In the second embodiment as in the first embodiment, when fetching the level data En of the detection signal from the A/D converter 35, the microcomputer 36 checks if the first condition of En−2<LB, LB≦En−1≦LA and LA<En is satisfied. If the first condition is not satisfied, the microcomputer 36 checks if the second condition of LA<En−2, LB≦En−1-≦LA and En<LB is satisfied.

When the first condition is satisfied, the level data En−1 is stored as the level data Vx in the memory 37, not being compared with the reference voltage LDC. This level data Vx and the level data Vx−1 and Vx−2 both previously stored in the memory 37 are averaged, and the average value or average level data Ex is compared with the reference voltage LDC. If Ex<LDC, the phase of the reproduced clock signal is judged as leading, and the lag signal S2 is supplied to the phase controller 38. If Ex>LDC, the phase of the reproduced clock signal is judged as lagging, and the lead signal S1 is sent to the phase controller 38. Further if Ex=LDC, the phase of the reproduced clock signal is judged as normal, and neither lead signal nor lag signal is sent to the phase controller 38.

When the second condition is satisfied, the level data En−1 is stored as the level data Vy in the memory 37, not being compared with the reference voltage LDC. This level data Vy and the level data Vy−1 and Vy−2 both previously stored in the memory 37 are averaged, and the average value or average level data Ey is compared with the reference voltage LDC. If Ey-1<LDC, the phase of the reproduced clock signal is judged as lagging, and the lead signal S1 is supplied to the phase controller 38. If En−1>LDC, the phase of the reproduced clock signal is judged as leading, and the lag signal S2 is sent to the phase controller 38. Further if Ey=LDC, the phase of the reproduced clock signal is judged as normal, and neither lead signal nor lag signal is sent to the phase controller 38.

In other words, only when the detection signal satisfies the first condition or the second condition, the phase of the reproduced clock is checked, and phase control is performed when there is a phase difference. This method can improve the stability of the phase control, which may be deteriorated by noise and a phase jitter, as compared with the conventional method that compares every zero cross with the phase of the reproduced clock signal, so that the reproduced clock can accurately be synchronized with the detection signal.

Particularly, since three level data, Vx, Vx−1 and Vx−2, or Vy, Vy−1 and Vy−2, acquired by repetitive sampling, are averaged in the second embodiment, influence of noise, if present on the detection signal, can be sufficiently decreased.

A radio communication apparatus according to the third embodiment of the present invention will now be described referring to FIGS. 14 to 21.

The demodulation section of the radio communication apparatus has the same arrangement as that of the first embodiment, except for the arrangement in the microcomputer 36. The differences between this embodiment and the first embodiment will now be explained.

Figure 15:
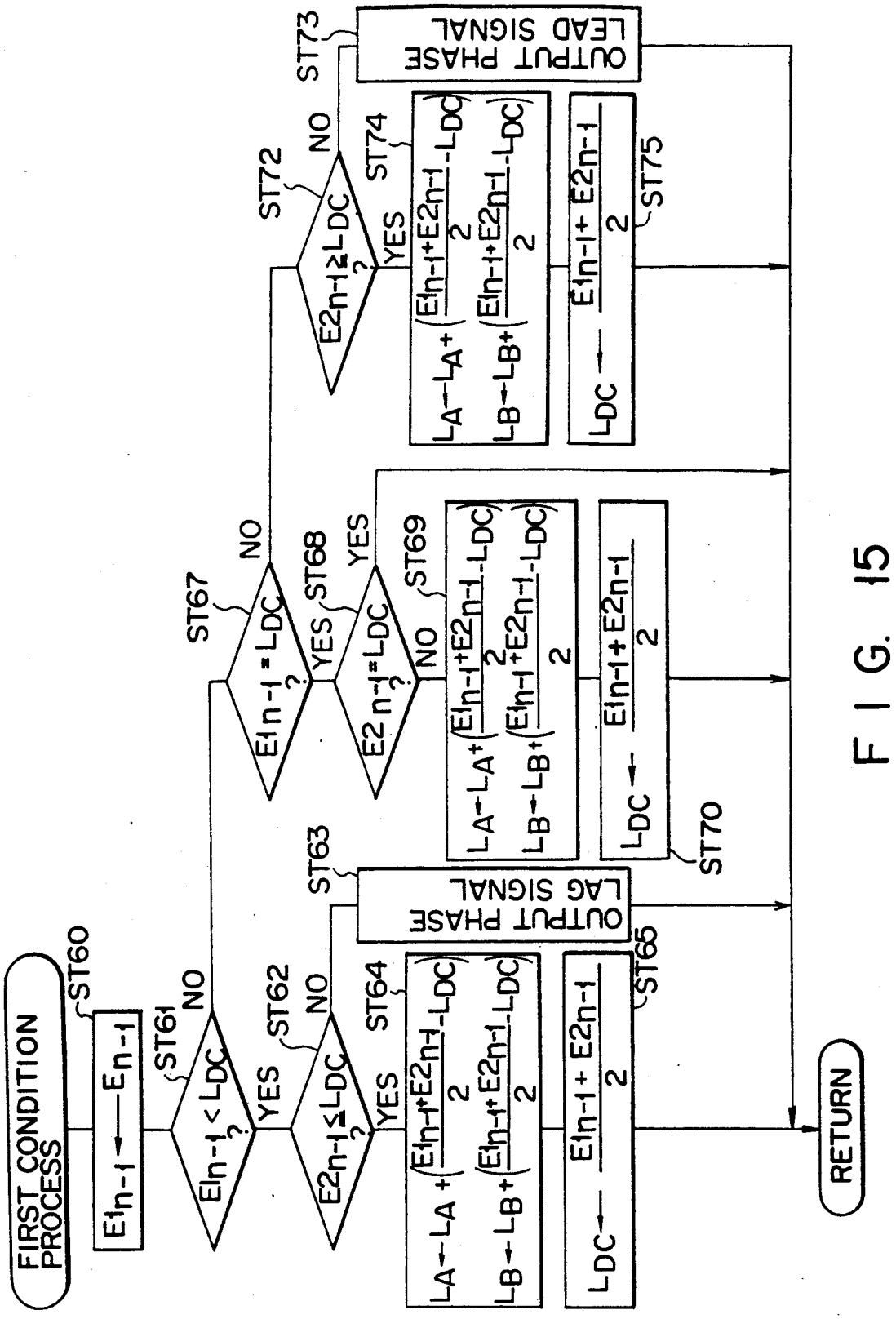
Figure 16:
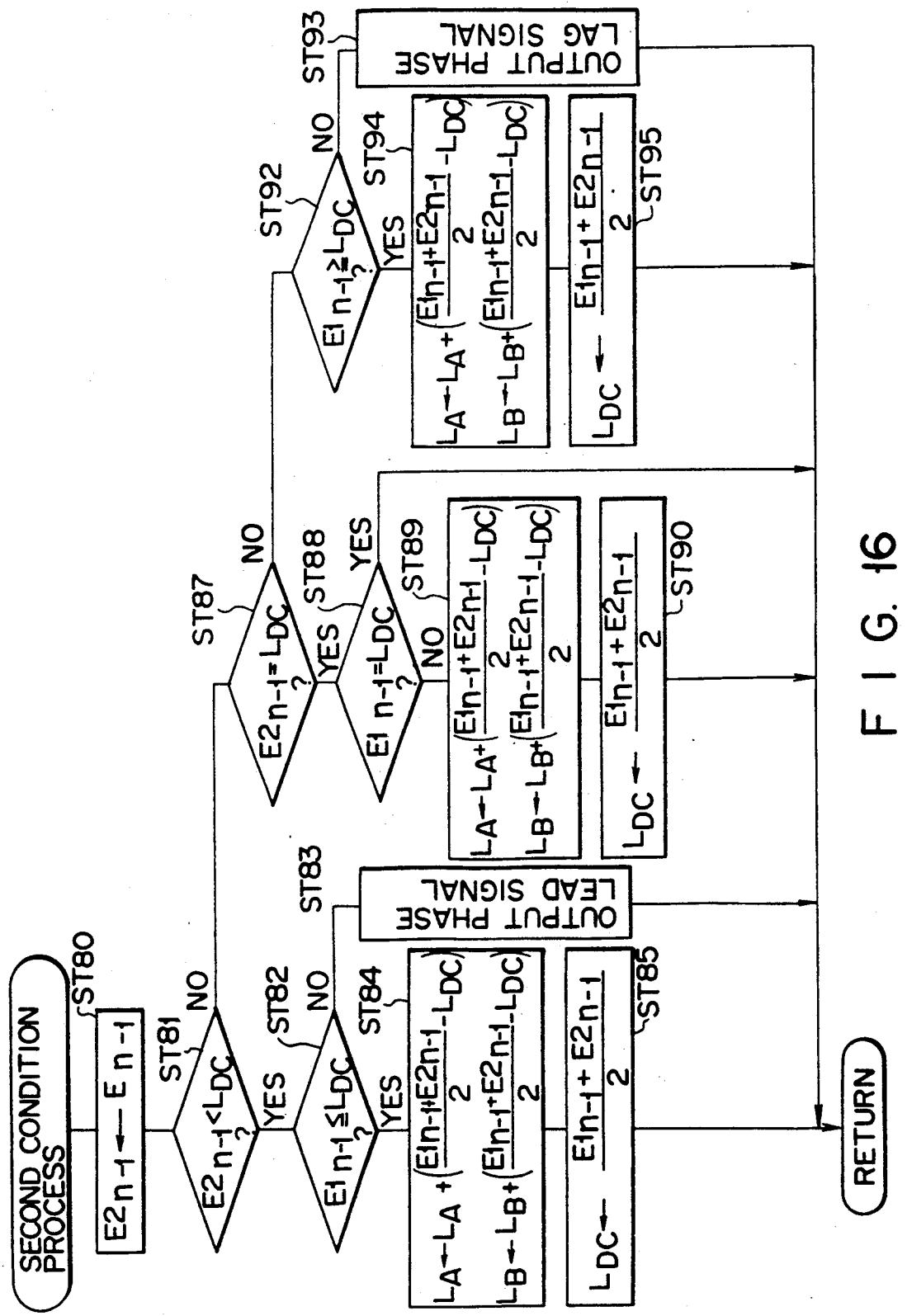

The microcomputer 36 in the third embodiment is programmed to execute processes shown in FIGS. 14 through 16. As shown in FIG. 14, the microcomputer 36 checks in step ST51 whether or not the level data En from the A/D converter 35 is received. When the reception of the level data En is confirmed, the microcomputer 36 stores En into the memory 37, and compares the level data En−1 and En−2, which have been stored in the memory 37 before the level data En, with the third threshold voltage LA and the fourth threshold voltage LB in step ST52. In subsequent step ST53, it is checked if the first condition of En−2<LB, LB≦En−1≦LA and LA<En is satisfied. If the first condition is not satisfied, it is checked in step ST54 if the second condition of LA<En−2, LB≦En−1≦LA and En<LB is satisfied. If the second condition is not satisfied either, the microcomputer 36 sets the level data En−1 stored in the memory 37 to the level data En−2, and sets the level data En to the level data En−1 in step ST55. Then, the microcomputer 36 returns to step ST51. If the first condition is satisfied in step ST53, the microcomputer 36 executes the first condition process in step ST56, and then executes step ST55. If the second condition is satisfied in step ST54, the microcomputer 36 performs the second condition process in step ST57, and then executes step ST55.

FIG. 15 illustrates the first condition process to be performed in step ST56. When the first condition process starts, the level data En−1 is stored as level data E1n-1 in the memory 37 in step ST60. It is checked in step ST61 if E1n-1<LDC. If E1n-1<LDC is detected, it is checked in step ST62 whether or not E2n−1≦LDC. The level data E2n−1 represents the value of the level data En−1 to be stored in the memory 37 in the second condition process which is executed when the second condition is satisfied. If E2n−1≦LDC is not satisfied, the lag signal S2 is sent to the phase controller 38 in step ST63, and the first condition process is terminated. If E2n−1≦LDC is determined in step ST62, the third and fourth threshold voltages LA and LB stored in the memory 37 are altered in step ST64 along with the first and second threshold voltages L1 and L2, and the reference voltage LDC stored in the memory 37 is altered in step ST65, and the first condition process is terminated. The threshold voltage LA is altered to LA+{(E1n−-1+E2n−1)/2−LDC}, the threshold voltage LB to LB+{E1n−1+E2n−1)/2−LDC}, the threshold voltage L1 is altered to L1+{((E1n−-1+E2n−1)/2−LDC}, the threshold voltage L2 to L2+{(E1n−1+E2n−1)/2−LDC}, and the reference voltage LDC to (E1n−1+E2n−1)/2.

If E1n−1<LDC is not satisfied in step ST61, it is checked in step ST67 if E1n−1=LDC. If $E1n-1=LDC$ is detected, it is checked in step ST68 whether or not $E2n-1=LDC$. If $E2n-1=LDC$ is satisfied, the first condition process is terminated. If $E2n-1=LDC$ is not determined in step ST68, the third and fourth threshold voltages LA and LB stored in the memory 37 are altered in step ST69 along with the first and second threshold voltages L1 and L2, and the reference voltage LDC stored in the memory 37 is altered in step ST70, and the first condition process is terminated. The threshold voltage LA is altered to $LA+\{(E1n-1+E2n-1)/2-LDC\}$, the threshold voltage LB to $LB+\{E1n-1+E2n-1)/2-LDC\}$, the threshold voltage L1 is altered to $L1+\{(E1n-1+E2n-1)/2-LDC\}$, the threshold voltage L2 to $L2+\{(E1n-1+E2n-1)/2-LDC\}$, and the reference voltage LDC to $(E1n-1+E2n-1)/2$.

If $E1n-1=LDC$ is not satisfied in step ST67, it is checked in step ST72 if $E2n-1\geq LDC$. If $E2n-1\leq LDC$ is not satisfied, the lead signal S1 is sent to the phase controller 38, and the first condition process is terminated. If $E2n-1\geq LDC$ is determined in step ST72, the third and fourth threshold voltages LA and LB stored in the memory 37 are altered in step ST74 along with the first and second threshold voltages L1 and L2, and the reference voltage LDC stored in the memory 37 is altered in step ST75, and the first condition process is terminated. The threshold voltage LA is altered to $LA+\{(E1n-1+E2n\ 1)/2-LDC\}$, the threshold voltage LB to $LB+\{E1n-1+E2n-1)/2-LDC\}$, the threshold voltage L1 is altered to $L1+\{(E1n-1+E2n-1)/2-LDC\}$, the threshold voltage L2 to $L2+\{(E1n-1+E2n-1)/2-LDC\}$, and the reference voltage LDC to $(E1n-1+E2n-1)/2$.

FIG. 16 illustrates the second condition process to be performed in step ST57. When the second condition process starts, the level data $En-1$ is stored as level data $E2n-1$ in the memory 37 in step ST80. It is checked in step ST81 if $E2n-1<LDC$. If $E2n-1<LDC$ is detected, it is checked in step ST82 whether or not $E1n-1\leq LDC$. The level data $E1n-1$ represents the value of the level data $En-1$ to be stored in the memory 37 in the first condition process which is executed when the first condition is satisfied. If $E1n-1\leq LDC$ is not satisfied, the lead signal S1 is sent to the phase controller 38 in step ST83, and the second condition process is terminated. If $E1n-1\leq LDC$ is determined in step ST82, the third and fourth threshold voltages LA and LB stored in the memory 37 are altered in step ST84 along with the first and second threshold voltages L1 and L2, and the reference voltage LDC stored in the memory 37 is altered in step ST85, and the second condition process is terminated. The threshold voltage LA is altered to $LA+\{(E1n-1+E2n-1)/2-LDC\}$, the threshold voltage LB to $LB+\{E1n-1+E2n-1)/2-LDC\}$, the threshold voltage L1 is altered to $L1+\{(E1n-1+E2n-1)/2-LDC\}$, the threshold voltage L2 to $L2+\{(E1n-1+E2n-1)/2-LDC\}$, and the reference voltage LDC to $(E1n-1+E2n-1)/2$.

If $E2n-1<LDC$ is not satisfied in step ST81, it is checked in step ST87 if $E2n-1=LDC$. If $E2n-1=LDC$ is detected, it is checked in step ST88 whether or not $E1n-1=LDC$. If $E1n-1=LDC$ is satisfied, the second condition process is terminated. If $E1n-1=LDC$ is not satisfied in step ST88, the third and fourth threshold voltages LA and LB stored in the memory 37 are altered in step ST89 along with the first and second threshold voltages L1 and L2, and the reference voltage LDC stored in the memory 37 is altered in step ST90, and the second condition process is terminated. The threshold voltage LA is altered to $LA+\{(E1n-1+E2n-1)/2-LDC\}$, the threshold voltage LB to $LB+\{E1n-1+E2n-1)/2-LDC\}$, the threshold voltage L1 is altered to $L1+\{(E1n-1+E2n-1)/2-LDC\}$, the threshold voltage L2 to $L2+\{(E1n-1+E2n-1)/2-LDC\}$, and the reference voltage LDC to $(E1n-1+E2n-1)/2$.

If $E2n-1=LDC$ is not satisfied in step ST87, it is checked in step ST92 if $E1n-1\geq LDC$. If $E1n-1\geq LDC$ is not satisfied, the lag signal S2 is supplied to the phase controller 38, and the second condition process is terminated. If $E1n-1\geq LDC$ is determined in step ST92, the third and fourth threshold voltages LA and LB stored in the memory 37 are altered in step ST94 along with the first and second threshold voltages L1 and L2, and the reference voltage LDC stored in the memory 37 is altered in step ST95, and the second condition process is terminated. The threshold voltage LA is altered to $LA+\{(E1n-1+E2n-1)/2-LDC\}$, the threshold voltage LB to $LB+\{E1n-1+E2n-1)/2-LDC\}$, the threshold voltage L1 is altered to $L1+\{(E1n-1+E2n-1)/2-LDC\}$, the threshold voltage L2 to $L2+\{(E1n-1+E2n-1)/2-LDC\}$, and the reference voltage LDC to $(E1n-1+E2n-1)/2$.

Figure 17:
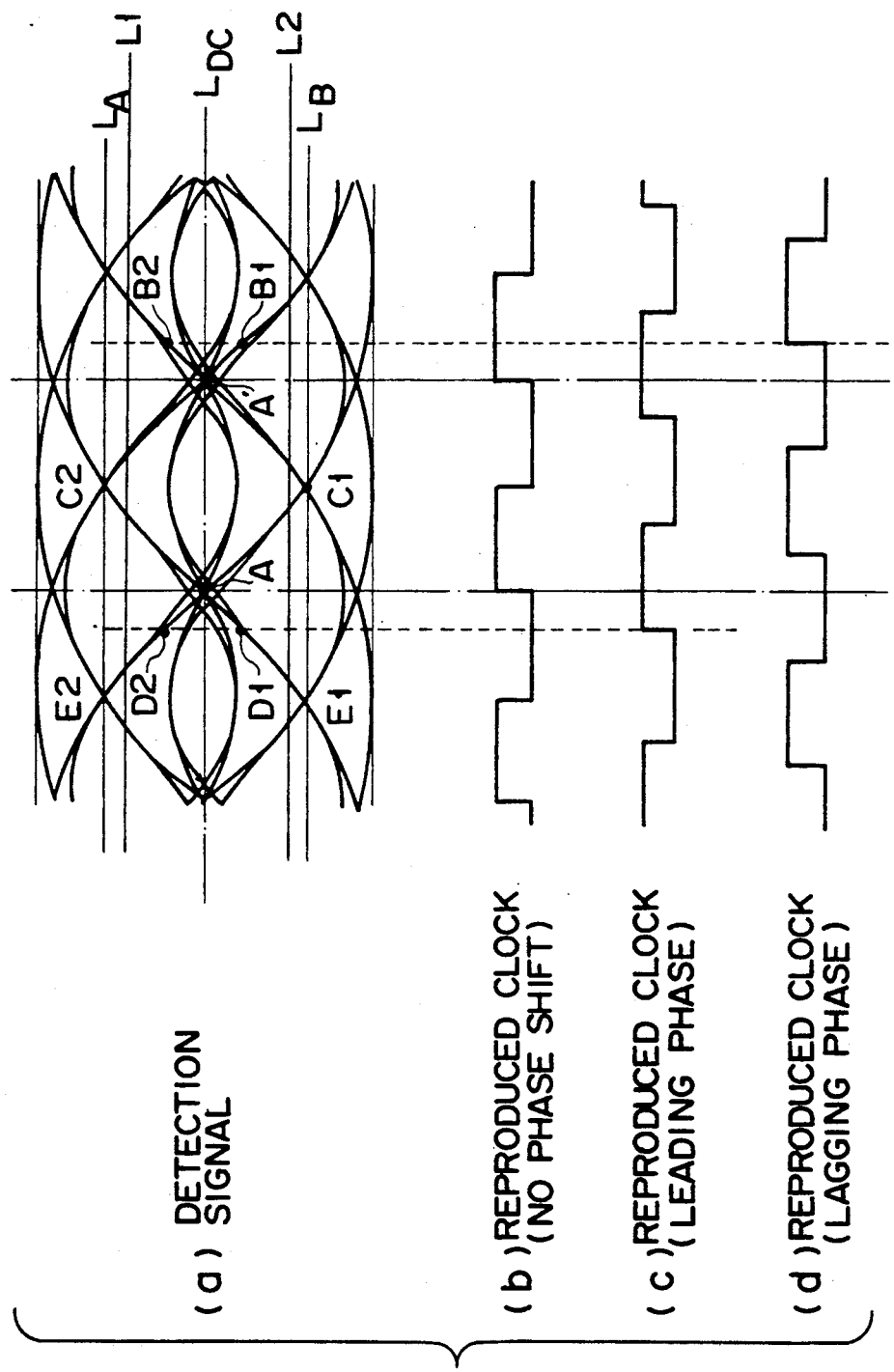
Figure 19:
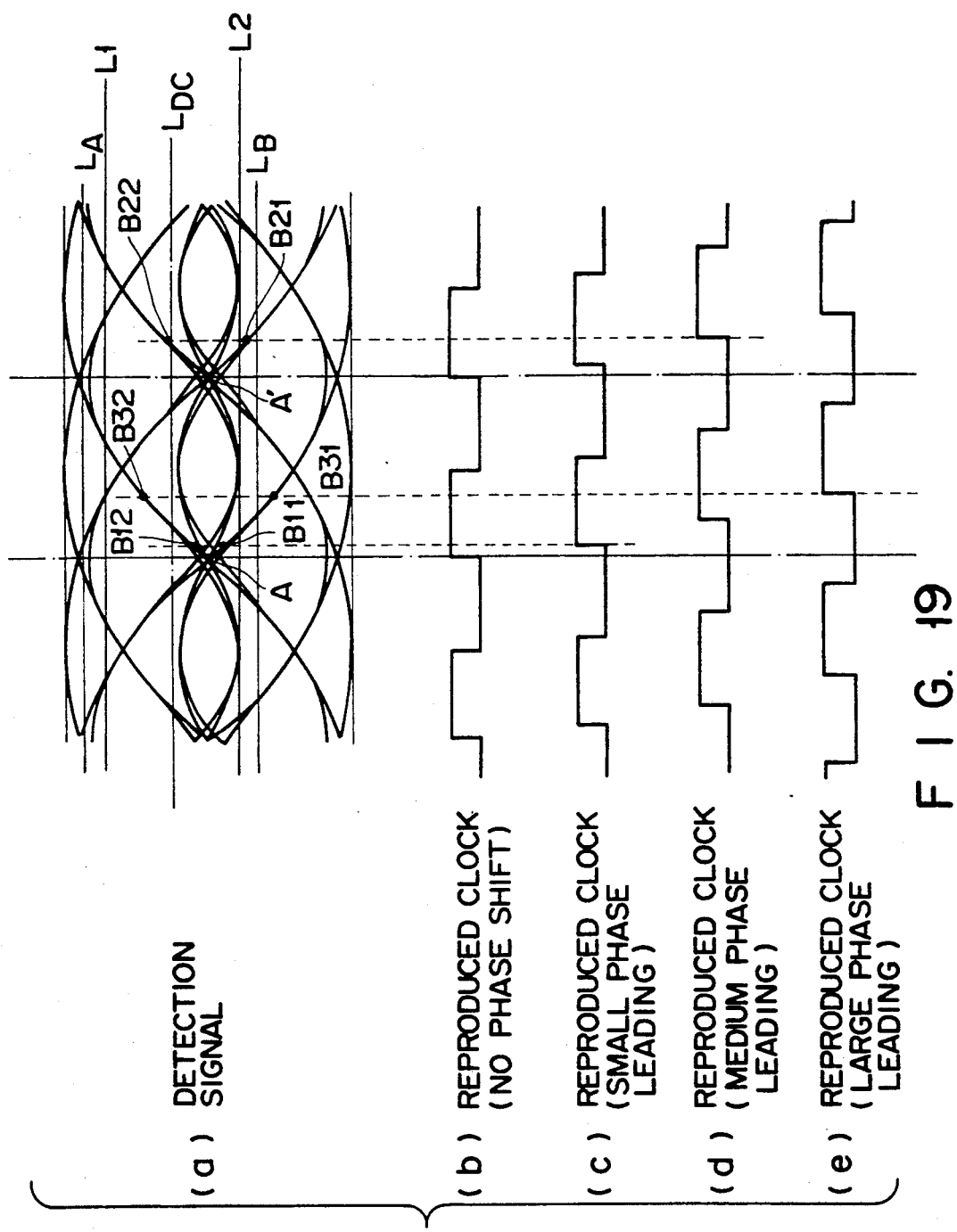
Figure 20:
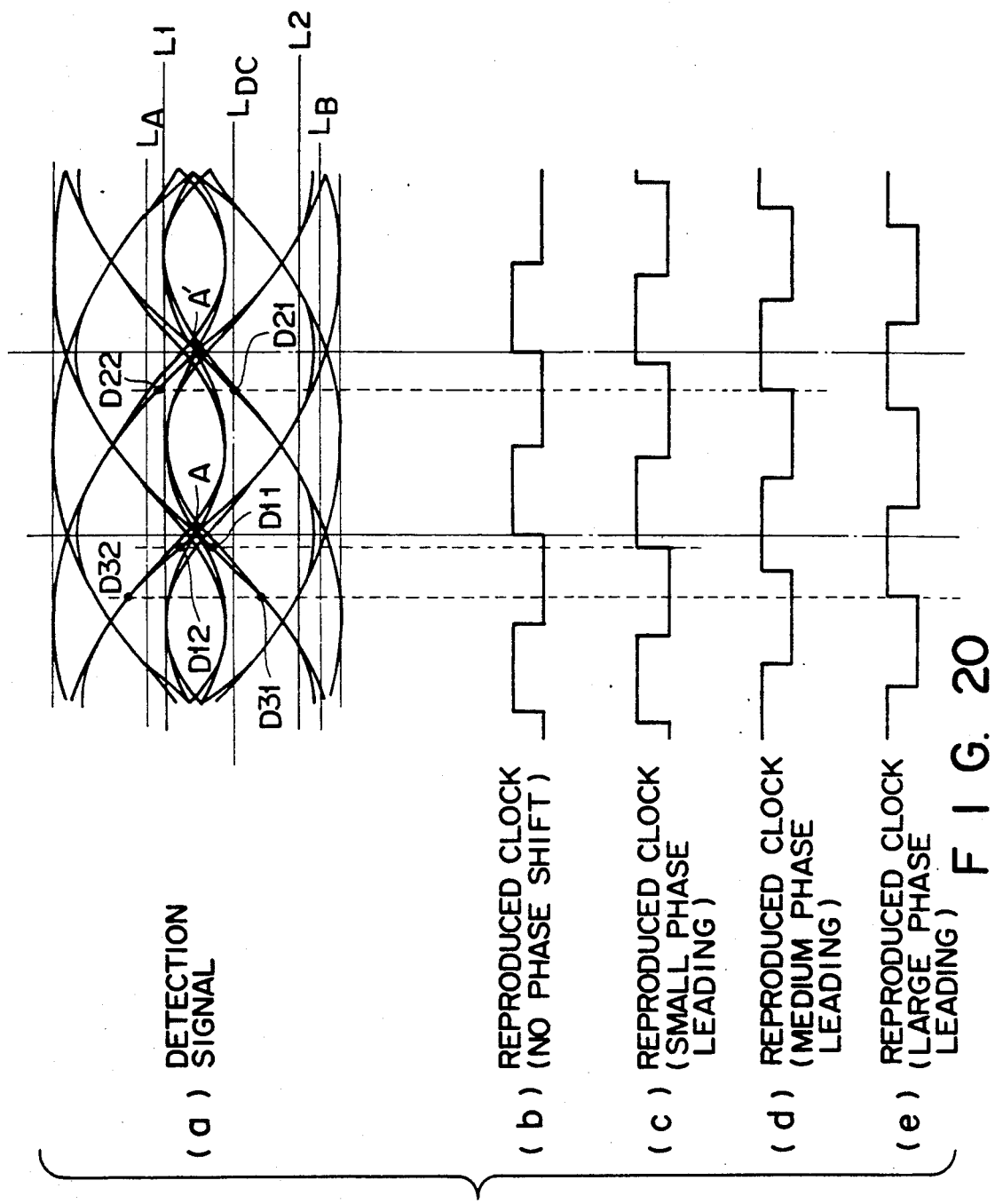

FIG. 17 illustrates the case where the level of the detection signal is not drifted. FIG. 18 illustrates the case where the level of the detection signal is drifted to the negative side and the phase of the reproduced clock signal leads to that of the detection signal. FIG. 19 shows when the level of the detection signal is drifted to the negative side and the reproduced clock signal lags behind that of the detection signal. FIG. 20 illustrates when the level of the detection signal is drifted to the positive side and the phase of the reproduced clock signal leads to that of the detection signal. FIG. 21 shows when the level of the detection signal is drifted to the positive side and the phase of the reproduced clock signal lags behind that of the detection signal.

According to the above-described third embodiment, if no drift occurs on the detection signal level but the reproduced clock signal has a leading phase as shown in (c) of FIG. 17, $E1n-1$ is lower than LDC and $E2n-1$ is higher than LDC. Therefore, no compensation for the reference voltage LDC is performed, and just the lag signal S2 is generated to delay the phase of the reproduced clock signal.

If the detection signal level is not drifted but the reproduced clock signal has a lagging phase as shown in (d) of FIG. 17, $E1n-1$ is higher than LDC and $E2n-1$ is lower than LDC. Therefore, no compensation for the reference voltage LDC is performed, and the lead signal S1 is generated to lead the phase of the reproduced clock signal.

If the level of the detection signal is drifted to the negative side with the phase of the reproduced clock signal unshifted, $E1n-1$ is lower than LDC and $E2n-1$ is lower than LDC. Therefore, the reference voltage LDC is compensated to be $(E1n-1+E2n-1)/2$. Further, the threshold voltages LA, LB, L1, and L2 are compensated by the augmenter of the reference voltage LDC.

If the level of the detection signal is drifted to the positive side with the phase of the reproduced clock signal unshifted, $E1n-1$ is higher than LDC and E2n−1 is higher than LDC. Therefore, the reference voltage LDC is compensated to be (E1n−−1+E2n−1)/2. Further, the threshold voltages LA, LB, L1 and L2 are compensated by the augmenter of the reference voltage LDC.

If the level of the detection signal is drifted to the negative side and the reproduced clock signal has a leading phase, the following control is performed. If E1n−1<LDC and E2n−1≦LDC are satisfied, the reference voltage LDC is compensated to be (E1n−−1+E2n−1)/2, and the threshold voltages LA, LB, L1, and L2 are compensated by the augmenter of the reference voltage LDC. When the center level of the detection signal is set to the reference voltage LDC by the compensation, simply the leading phase of the reproduced clock signal remains. At this time, E1n−1 is lower than LDC and E2n−1 is higher than LDC. Therefore, the reference voltage LDC is not compensated anymore, and the lag signal S2 is output to delay the phase of the reproduced clock signal.

Further, if the leading phase of the reproduced clock signal is considerably large when the level of the detection signal is drifted to the negative side, E1n−1 is lower than LDC and E2n−1 is higher than LDC. In this case, initially, the lagging signal S2 is output to delay the phase of the reproduced clock signal. Upon this phase control, E1n−1<LDC and E2n−1≦LDC are compensated to be (E1n−1+E2n−1)/2, and the threshold voltages LA, LB, L1, and L2 are compensated by the augmenter of the reference voltage LDC. When the center level of the detection signal is set to the reference voltage LDC by the compensation, simply the leading phase of the reproduced clock signal remains. At this time, E1n−1 is lower than LDC and E2n−1 is higher than LDC. Therefore, the lag signal S2 is output to further delay the phase of the reproduced clock signal.

If the level of the detection signal is drifted to the positive side and the reproduced clock signal has a LDC≦E1n−1 and LDC<E2n−1 are satisfied, the reference voltage LDC is compensated to be (E1n−−1+E2n−1)/2, and the threshold voltages LA, LB, L1, and L2 are compensated by the augmenter of the reference voltage LDC. When the center level of the detection signal is set to the reference voltage LDC by the compensation, simply the lagging phase of the reproduced clock signal remains. At this time, E1n−1 is lower than LDC and E2n−1 is higher than LDC. Therefore, the reference voltage LDC is not compensated anymore, and the lead signal S2 is output to lead the phase of the reproduced clock signal.

Further, if the leading phase of the reproduced clock signal is considerably large when the level of the detection signal is drifted to the positive side, E1n−1 is lower than LDC and E2n−1 is higher than LDC. In this case, initially, the lagging signal S2 is output to delay the phase of the reproduced clock signal. Upon this phase control, LDC≦E1n−1 and LDC<E2n−1 are satisfied. Thereafter, the reference voltage LDC is compensated to be (E1n−1+E2n−1)/2 and the threshold voltages LA, LB, L1, and L2 are compensated by the augmenter of the reference voltage LDC. When the center level of the detection signal is set to the reference voltage LDC by the compensation, simply the leading phase of the reproduced clock signal remains. At this time, E1n−1 is lower than LDC and E2n−1 is higher than LDC. Therefore, the lag signal S2 is output to further delay the phase of the reproduced clock signal.

The above described control is also performed when the level of the detection signal is drifted to the negative side and the reproduced clock signal has a lagging phase, and when the level of the detection signal is drifted to the positive side and the reproduced clock signal has a leading phase.

As described above, shifting of the levels of the detection signal and the reference voltage LDC can be surely compensated, and the phase shift of the reproduced clock signal is then compensated. It is therefore possible to always sample the received detection signal by an accurate reproduced clock signal for correct data discrimination.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A demodulating apparatus comprising:
   detector means for performing a frequency-detection on a digital modulation signal to acquire a detection signal;
   clock generating means for generating a clock signal; and
   discrimination means for sampling a voltage level of said detection signal from said detector means at a clock timing of said clock signal from said clock generating means, and converting the sampled voltage level into digital data, which is set to have one of first and second logic values on the basis of a reference voltage LDC;
   wherein said discrimination means includes control means for comparing the voltage level En sampled at a clock timing, voltage level En−1 sampled at a timing one clock earlier than En and voltage level En−2 sampled at a timing two clock earlier than En, with first and second threshold voltages LA and LB respectively higher and lower than said reference voltage LDC, and controlling said clock generating means to synchronize the phase of said clock signal with said detection signal when it is detected from the comparison that anyone of first and second conditions is satisfied where the first condition is En−2<LB, LB≦En−1≦LA and LA<En, and the second condition is LA<En−2, 2. A demodulating apparatus according to claim 1, wherein said control means includes phase shifting means for detecting a difference between the voltage level En−1 and the reference voltage LDC when one of the first and second conditions is satisfied, and shifting the phase of said clock signal in accordance with the difference therebetween.

3. A demodulating apparatus according to claim 2, wherein said phase shifting means includes means for delaying the phase of said clock signal when En−−1<LDC is satisfied under the first condition and when En−1>LDC under the second condition, and means for advancing the phase of said clock signal when En−1>LDC is satisfied under the first condition and when En−1<LDC under the second condition.

4. A demodulating apparatus according to claim 1, wherein said control means includes phase shifting means for averaging the voltage levels sequentially sampled a preset number of times and including the voltage level En as the newest one when one of the first and second conditions is satisfied, and detecting a difference between the average level thereof and the reference voltage LDC, and shifting the phase of said clock signal in accordance with the difference therebetween.

5. A demodulating apparatus according to claim 4, wherein said phase shifting means includes means for delaying the phase of said clock signal when $Ex<LDC$ is satisfied and when $Ey>LDC$ is satisfied where Ex is an average level obtained when the first condition is satisfied and Ey is an average level obtained when the second condition is satisfied, and means for advancing the phase of said clock signal when $Ex>LDC$ is satisfied and when $Ey<LDC$ is satisfied.

6. A demodulating apparatus according to claim 2, wherein said control means includes voltage compensating means for setting the voltage level En to $E1n-1$ when the ( first condition is satisfied and to $E2n-1$ when the second condition is satisfied, compensating the reference voltage LDC to an average of the voltage levels $E1n-1$ and $E2n-1$ when $E1n-1<LDC$ and $E2n-1\leq LDC$ are satisfied under the first condition, when $E1n-1=LDC$ and $E2n-1\neq LDC$ are satisfied under the first condition, when $En-1>LDC$ and $LDC\leq E2n-1$ are satisfied under the first condition, when $E2n-1<LDC$ and $E1n-1\leq LDC$ are satisfied under the second condition, when $E2n-1=LDC$ and $E1n-1\neq LDC$ are satisfied under the second condition, and when $E2n-1>LDC$ and $LDC\leq E1n-1$ are satisfied under the second condition.

7. A demodulating apparatus according to claim 6, wherein said control means includes phase shifting means for detecting a difference between the reference voltage LDC and the voltage level $E1n-1$ under the first condition and between the reference voltage LDC and the voltage level $E2n-1$ under the second condition, and shifting the phase of said clock signal in accordance with the difference therebetween.

8. A demodulating apparatus according to claim 7, wherein said phase shifting means includes means for delaying the phase of said clock signal when $E1n-1<LDC$ and $E2n-1>LDC$ are satisfied, and means for advancing the phase of said clock signal when $E1n-1>LDC$ and $E2n-1<LDC$.

9. A demodulating apparatus according to claim 6, wherein said voltage compensating means includes means for compensating first and second threshold voltages LA and LB in accordance with a change in said reference voltage LDC.

10. A demodulating apparatus according to claim 6, wherein said discrimination means includes means for determining that the digital data has a first logic value when the sampled voltage level is above a third threshold voltage L1 and a second logic value when the sampled voltage level is below a fourth threshold voltage L2 lower than the third threshold voltage L1, and said voltage compensating means includes means for compensating the third and fourth threshold voltages L1 and L2 in accordance with a change in said reference voltage LDC.

11. A demodulating method comprising:
a first step of performing a frequency-detection on a digital modulation signal to acquire a detection signal;
a second step of generating a clock signal;
a third step of sampling a voltage level of said detection signal at a clock timing of said clock signal, and converting the sampled voltage level into digital data, which is set to have one of first and second logic values on the basis of a reference voltage LDC; and
a fourth step of comparing the voltage level En sampled at a clock timing, voltage level $En-1$ sampled at a timing one clock earlier than En and voltage level $En-2$ sampled at a timing two clock earlier than En, with first and second threshold voltages LA and LB respectively higher and lower than said reference voltage LDC, and controlling the phase of said clock signal to be synchronized with said detection signal when it is detected from the comparison that anyone of first and second conditions is satisfied where the first condition is $En-2<LB$, $LB\leq En-1\leq LA$ and $LA<En$, and the second condition is $LA<En-2$, $LB\leq En-1\leq LA$ and $En<LB$.

12. A demodulating method according to claim 11, wherein said fourth step includes a phase shifting step of detecting a difference between the voltage level $En-1$ and the reference voltage LDC when one of the first and second conditions is satisfied, and shifting the phase of said clock signal in accordance with the difference therebetween.

13. A demodulating method according to claim 12, wherein said phase shifting step includes a step of delaying the phase of said clock signal when $En-1<LDC$ is satisfied under the first condition and when $En-1>LDC$ under the second condition, and a step of advancing the phase of said clock signal when $En-1>LDC$ is satisfied under the first condition and when $En-1<LDC$ under the second condition.

14. A demodulating method according to claim 11, wherein said fourth step includes a phase shifting step of averaging the voltage levels sequentially sampled a preset number of times and including the voltage level En as the newest one when one of the first and second conditions is satisfied, and detecting a difference between the average level thereof and the reference voltage LDC, and shifting the phase of said clock signal in accordance with the difference therebetween.

15. A demodulating method according to claim 14, wherein said phase shifting step includes a step of delaying the phase of said clock signal when $Ex<LDC$ is satisfied and when $Ey>LDC$ is satisfied where Ex is an average level obtained when the first condition is satisfied and Ey is an average level obtained when the second condition is satisfied, and a step of advancing the phase of said clock signal when $Ex>LDC$ is satisfied and when $Ey<LDC$ is satisfied.

16. A demodulating method according to claim 12, wherein said fourth step includes a voltage compensating step of setting the voltage level En to $E1n-1$ when the condition is satisfied, compensating the reference voltage LDC to an average of the voltage levels $E1n-1$ and $E2n-1$ when $E1n-1<LDC$ and $E2n-1\leq LDC$ are satisfied under the first condition, when $E1n-1=LDC$ and $E2n-1\neq LDC$ are satisfied under the first condition, when $En-1>LDC$ and $LDC\leq E2n-1$ are satisfied under the first condition, when $E2n-1<LDC$ and $E1n-1\leq LDC$ are satisfied under the second condition, when $E2n-1=LDC$ and $E1n-1\neq LDC$ are satisfied under the second condition, and when $E2n-1>LDC$ and $LDC\leq E1n-1$ are satisfied under the second condition.

17. A demodulating method according to claim 16, wherein said fourth step includes a phase shifting step of detecting a difference between the reference voltage LDC and the voltage level E1n−1 under the first condition and between the reference voltage LDC and the voltage level E2n−1 under the second condition, and shifting the phase of said clock signal in accordance with the difference therebetween.

18. A demodulating method according to claim 17, wherein said phase shifting step includes a step of delaying the phase of said clock signal when E1n−1<LDC and E2n−1>LDC are satisfied, and a step of advancing the phase of said clock signal when E1n−1>LDC and E2n−1<LDC.

19. A demodulating method according to claim 16, wherein said voltage compensating step includes a step of compensating first and second threshold voltages LA and LB in accordance with a change in said reference voltage LDC.

20. A demodulating method according to claim 16, wherein said third step includes a step of determining that the digital data has a first logic value when the sampled voltage level is above a third threshold voltage L1 and a second logic value when the sampled voltage level is below a fourth threshold voltage L2 lower than the third threshold voltage L1, and said voltage compensating step includes a step of compensating the third and fourth threshold voltages L1 and L2 in accordance with a change in said reference voltage LDC.

* * * * *

UNITED STATES PATENT AND TRADEMARK OFFICE
CERTIFICATE OF CORRECTION

PATENT NO. : 5,111,152
DATED : May 5, 1992
INVENTOR(S) : MAKINO

It is certified that error appears in the above-indentified patent and that said Letters Patent is hereby corrected as shown below:

Column 17, line 17 (claim 6), change "En" to --En-1-- line 18 (claim 6), delete "("

line 24 (claim 6), change "En-1" to --E1n-1--

Column 18, line 53 (claim 16), change "En" to --En-1-- line 59 (claim 16), change "En-1" to --E1n-1--

Signed and Sealed this

Seventh Day of May, 1996

Attest:

BRUCE LEHMAN

Attesting Officer        Commissioner of Patents and Trademarks